(12) United States Patent
Clayton

(10) Patent No.: US 12,163,499 B1
(45) Date of Patent: Dec. 10, 2024

(54) OSCILLATING WATER COLUMN TURBINE APPARATUSES

(71) Applicant: Stephen G. Clayton, Talent, OR (US)

(72) Inventor: Stephen G. Clayton, Talent, OR (US)

( * ) Notice: Subject to any disclaimer, the term of this patent is extended or adjusted under 35 U.S.C. 154(b) by 221 days.

(21) Appl. No.: 18/093,071

(22) Filed: Jan. 4, 2023

Related U.S. Application Data

(60) Provisional application No. 63/298,017, filed on Jan. 10, 2022.

(51) Int. Cl.
| | | |
|---|---|---|
| *H02K 7/18* | (2006.01) | |
| *F03B 3/12* | (2006.01) | |
| *F03B 13/08* | (2006.01) | |
| *F03B 13/26* | (2006.01) | |
| *F03B 17/00* | (2006.01) | |

(52) U.S. Cl.
CPC ............ *F03B 13/086* (2013.01); *F03B 3/121* (2013.01); *F03B 13/262* (2013.01); *F03B 17/00* (2013.01); *H02K 7/1823* (2013.01)

(58) Field of Classification Search
CPC ..... H02K 7/1823; F03B 3/121; F03B 13/262; F03B 17/00
See application file for complete search history.

(56) References Cited

U.S. PATENT DOCUMENTS

| | | | |
|---|---|---|---|
| 9,765,753 B2 | 9/2017 | Freeman et al. | |
| 2019/0368464 A1* | 12/2019 | Knotts | F03B 17/061 |

FOREIGN PATENT DOCUMENTS

| | | |
|---|---|---|
| ES | 2729207 | 6/1992 |
| GB | 2250321 | 6/1992 |

OTHER PUBLICATIONS

Sayigh A, Air Turbines, Comprehensive Renewable Energy, (2012), vol. 8, pp. 111-149, Oxford, United Kingdom.
Das et al., Optimal design of air turbines for oscillating water column wave energy systems: A review, International Journal of Ocean and Climate Systems (2017), vol. 8(I) 37-49, United Kingdom.
Joubert et al., Wave Energy Converters, Centre for Renewable Sustainable Energy Studies (2013), South Africa.
Torre-Encisco, et al., Mutriku Wave Power Plant: from the thinking out to the reality, Porceedings of the 8th European Wave and Tidal Energy Conference (2009), Uppsala, Sweden.

* cited by examiner

*Primary Examiner* — Ramon M Barrera
(74) *Attorney, Agent, or Firm* — Jerry Haynes Law

(57) ABSTRACT

An apparatus for generating electricity from an oscillating water column may include a turbine having an inlet cap, an outlet cap, and an impeller rotatably disposed between the inlet cap and the outlet cap. The turbine may be deployed in a water cylinder having a water piston that slides between a first position and a second position in response to oscillation of water in the water cylinder, thereby creating a pressure difference to allow pressurized fluid to enter and/or escape through the components of the turbine to rotate the impeller of the turbine to facilitate generation of electricity and/or performance of other work. Other oscillating water column turbine apparatuses are also disclosed.

20 Claims, 22 Drawing Sheets

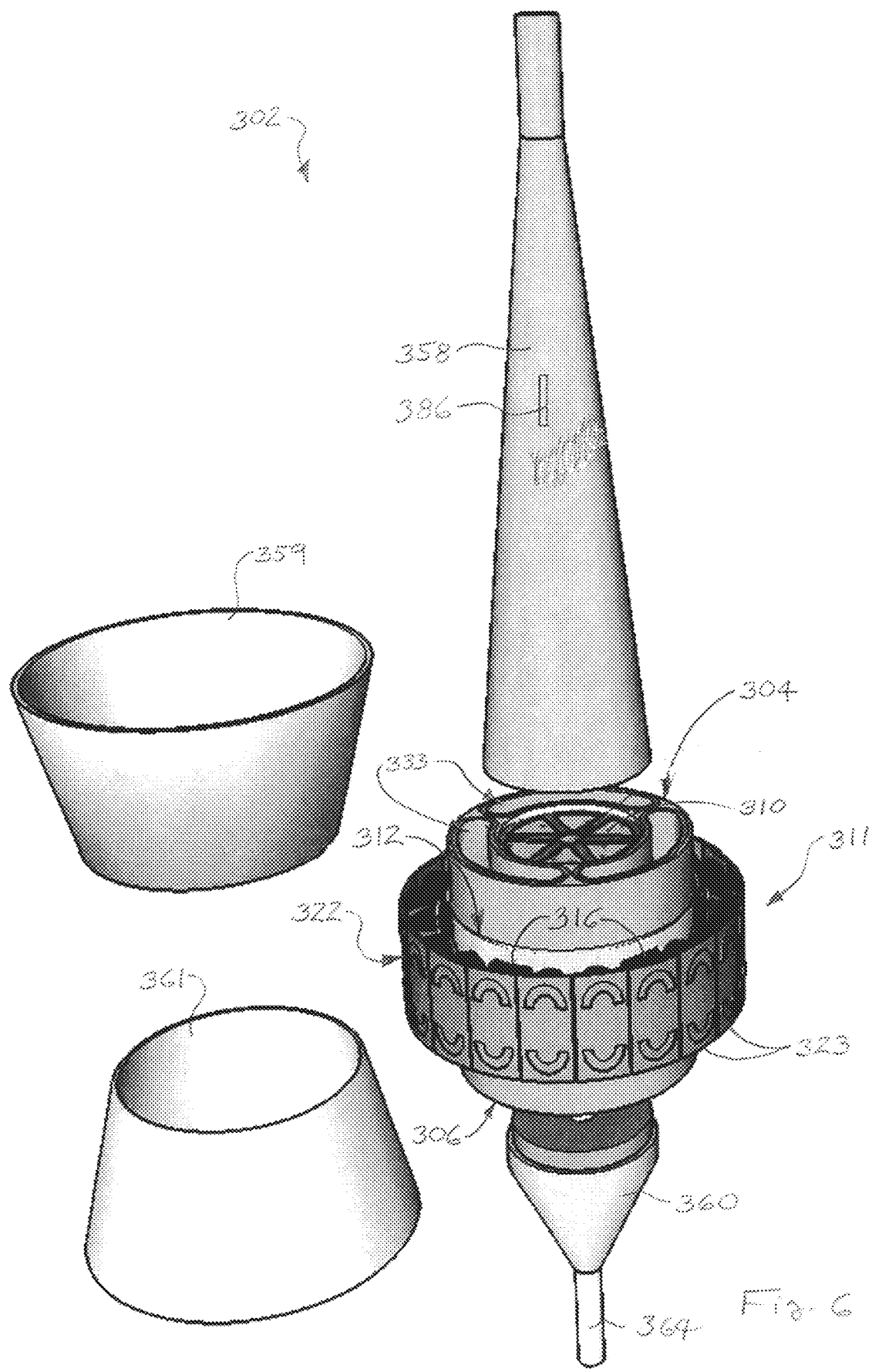

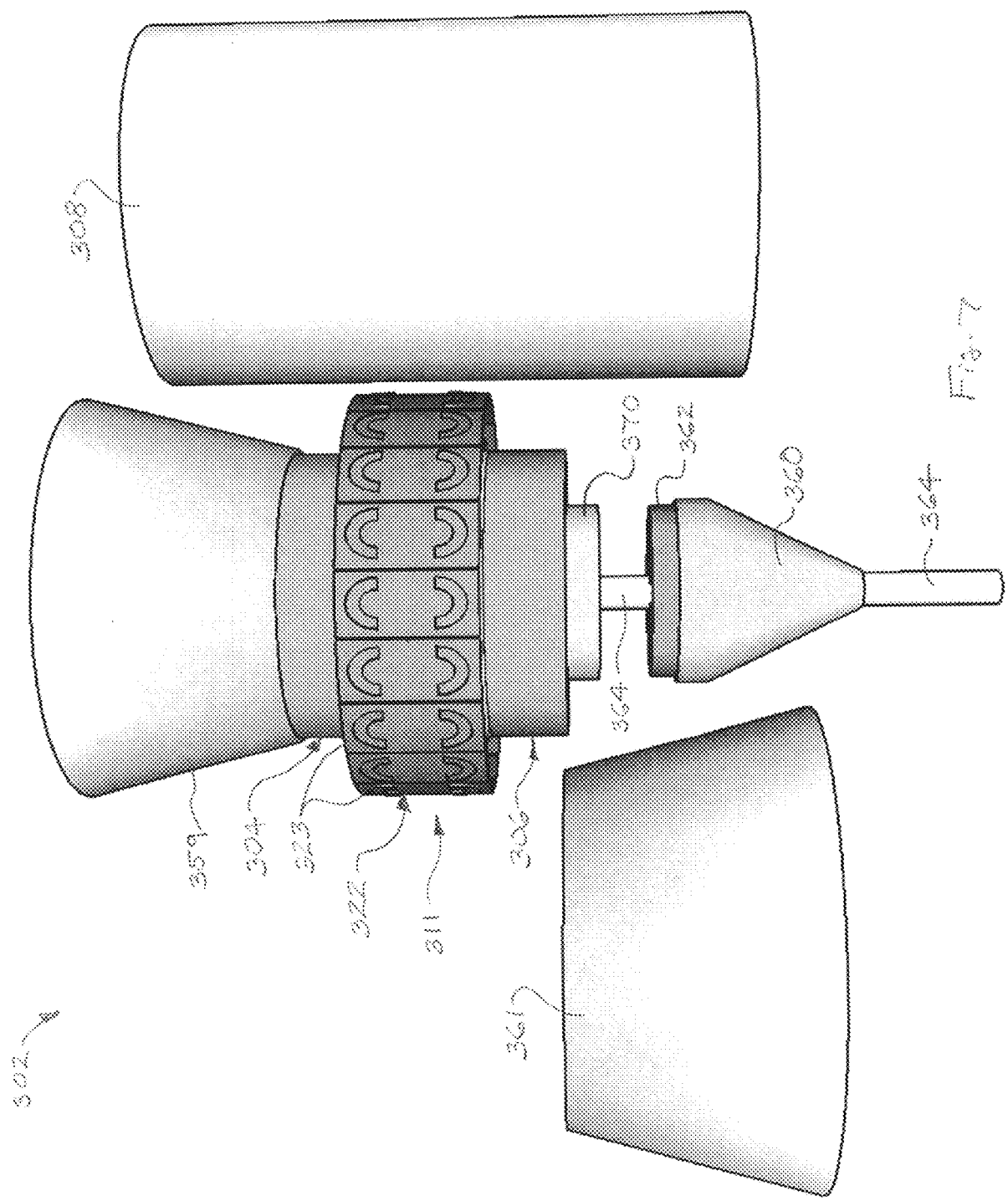

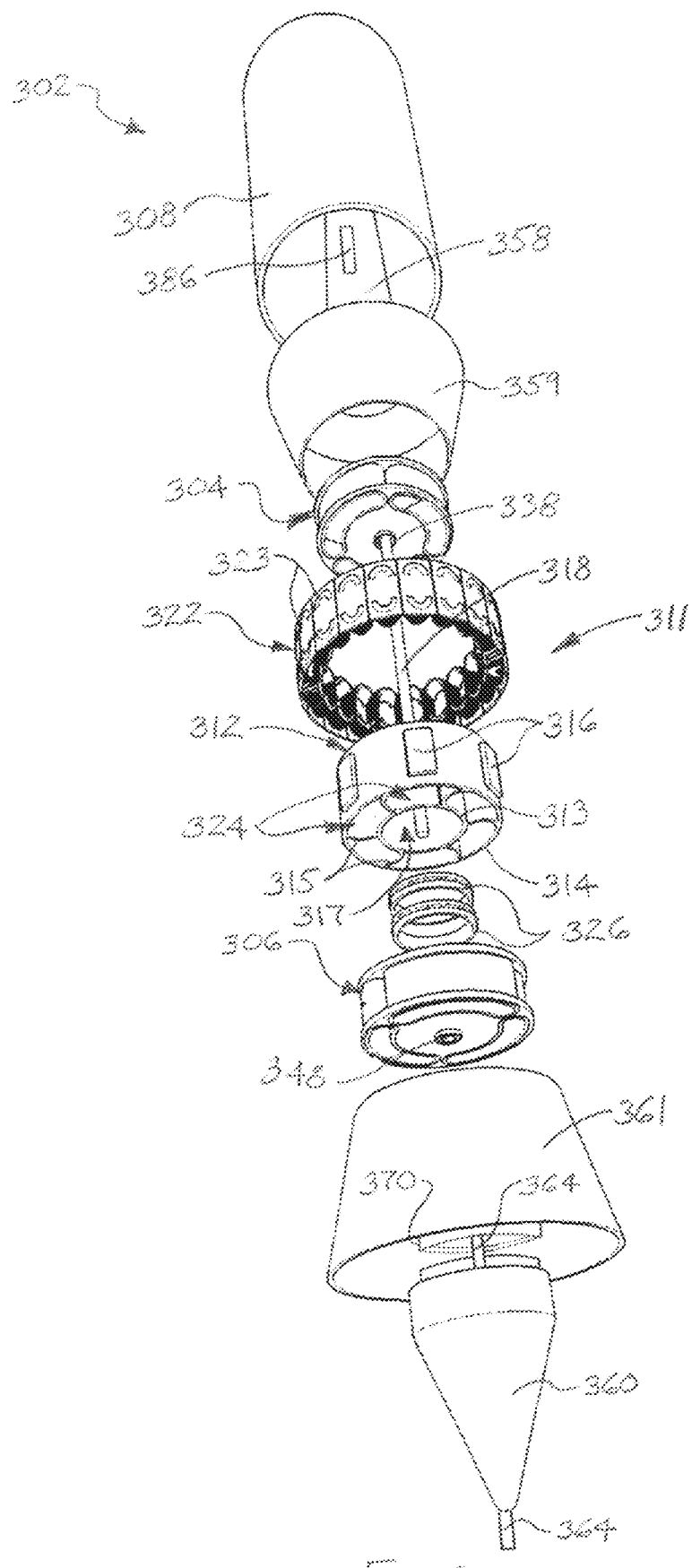

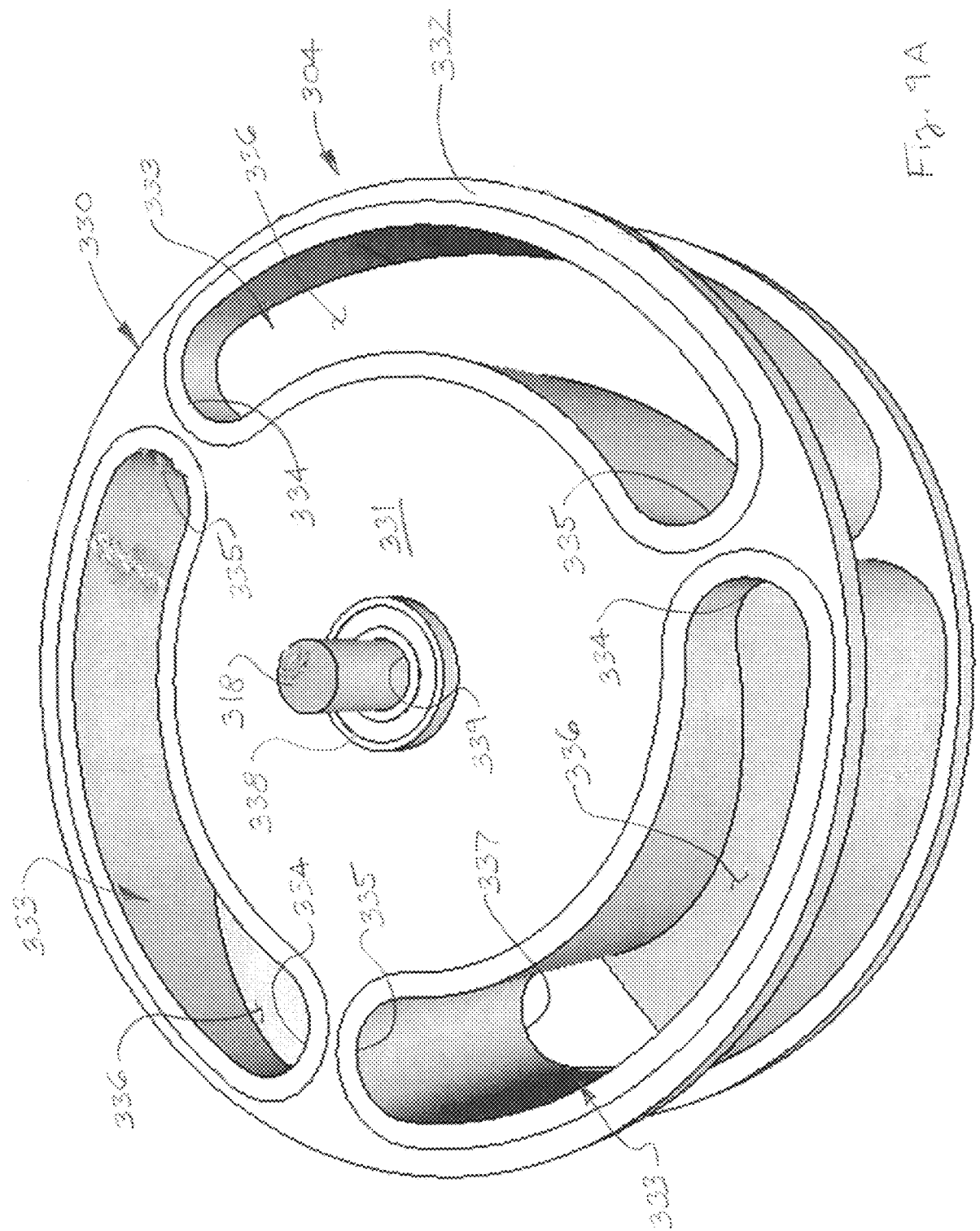

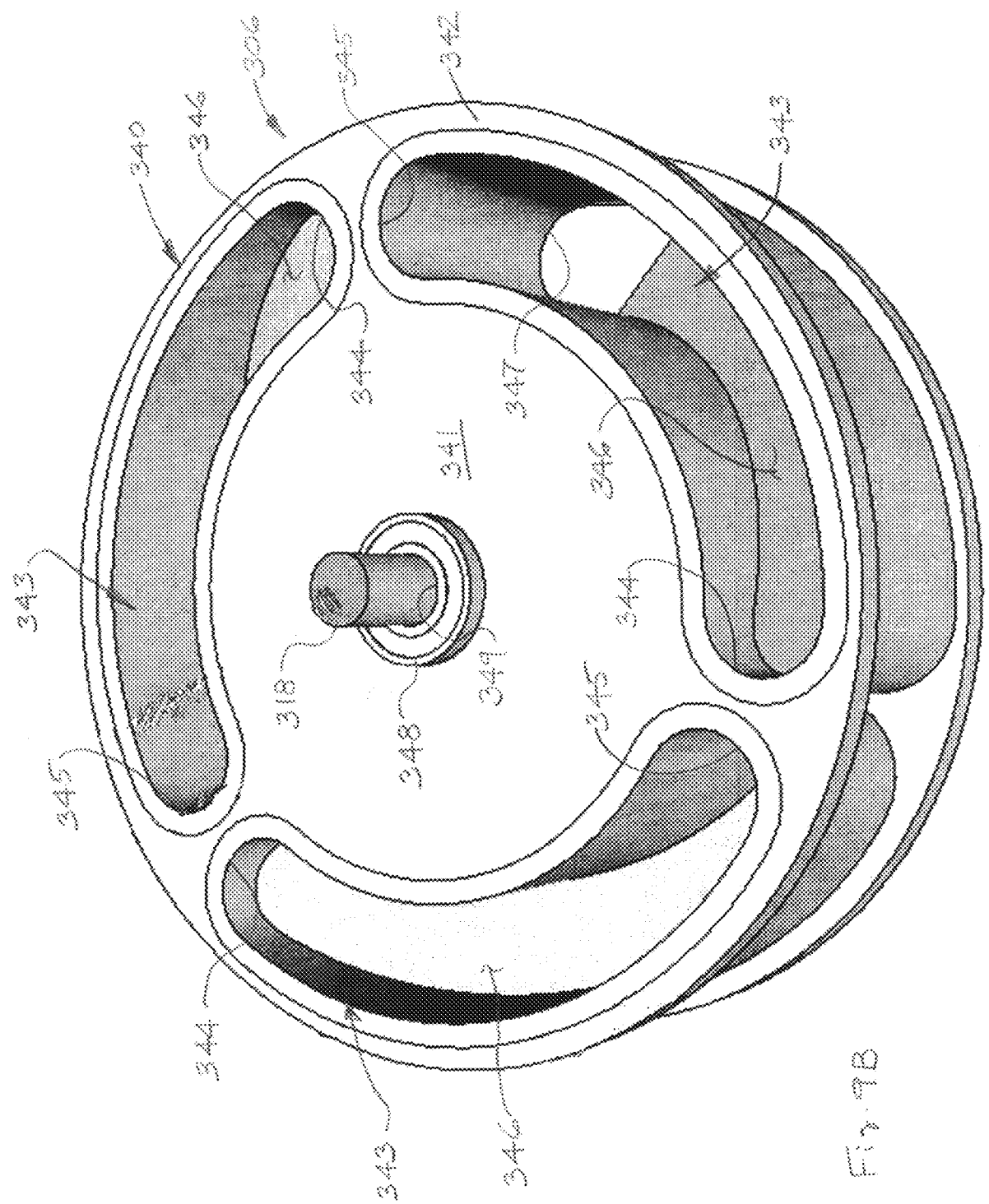

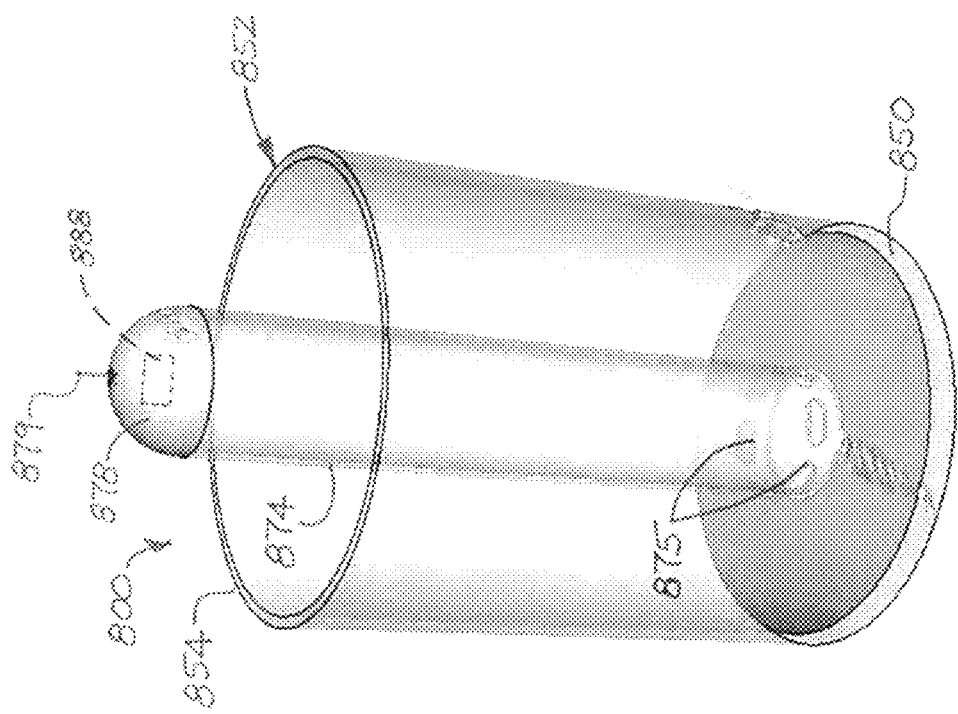
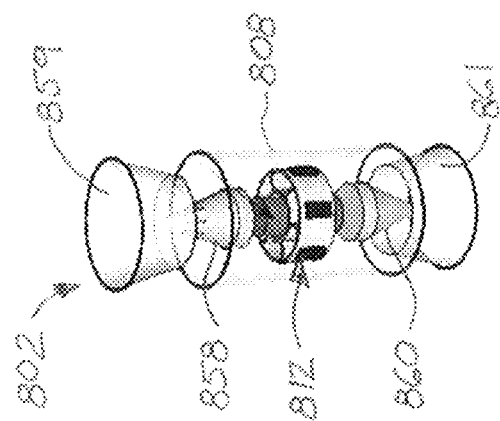
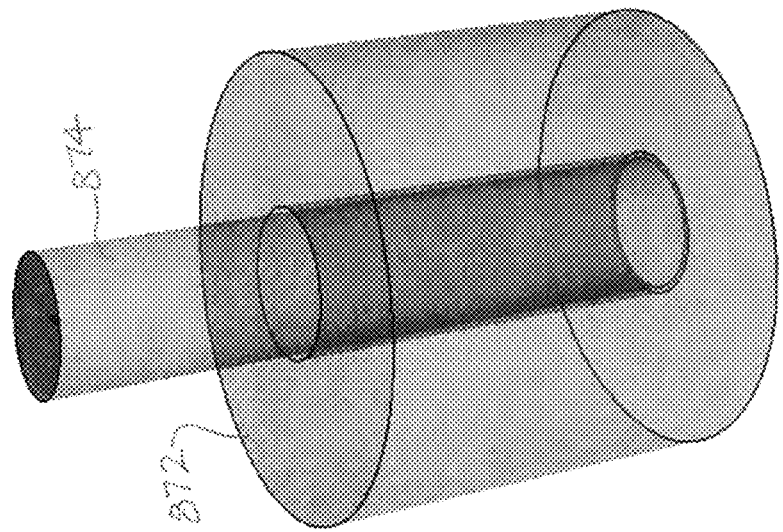

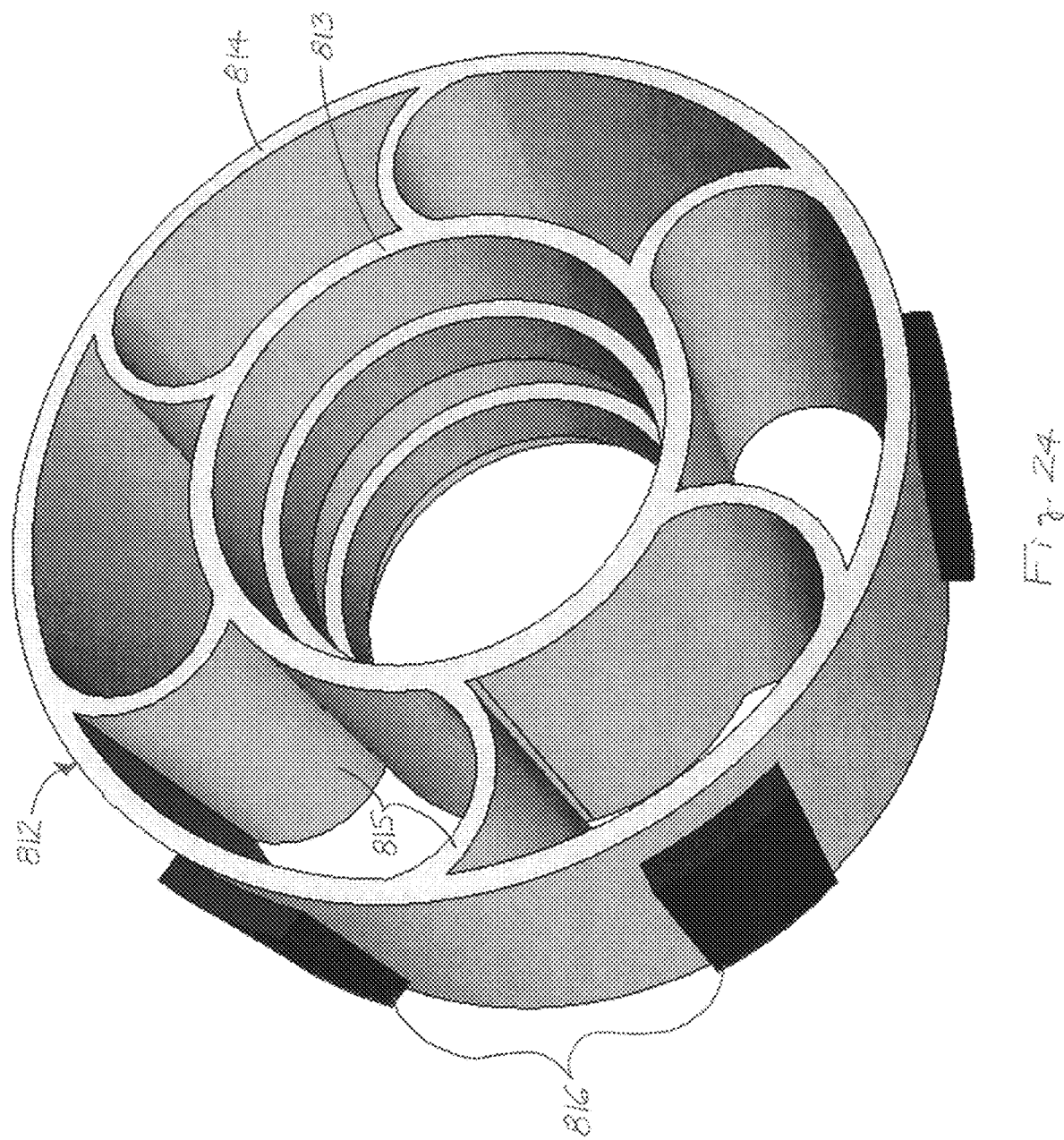

OSCILLATING WATER COLUMN TURBINE APPARATUSES

CROSS-REFERENCE TO RELATED APPLICATIONS

This application claims the benefit of U.S. provisional application No. 63/298,017, filed Jan. 10, 2022, and entitled OSCILLATING WATER COLUMN TURBINE, which provisional application is hereby incorporated by reference herein in its entirety.

FIELD OF THE INVENTION

The present invention relates to turbines for generating electrical power and/or other energy to perform work. More so, the present invention relates to oscillating water column turbine apparatuses configured to generate electrical power and/or perform other work responsive to oscillating water in an ocean, river, stream, or other water body.

BRIEF DESCRIPTION OF THE DRAWINGS

The invention will now be described, by way of example, with reference to the accompanying drawings, in which:

FIG. 1B illustrates front perspective view of a typical turbine suitable for the apparatus shown in FIG. 1A;

FIG. 6 is a top exploded perspective view of the turbine illustrated in FIG. 5;

FIG. 7 is a front perspective view of the turbine;

FIG. 8 is a bottom perspective view of the turbine;

FIG. 9A is a top perspective view of a typical inlet cap of the turbine;

FIG. 9B is a top perspective view of a typical outlet cap of the turbine;

FIG. 21 are perspective views of a typical inlet water column and working water column in typical application of the apparatus illustrated in FIG. 17;

FIG. 22 is a perspective view of a typical turbine of the apparatus illustrated in FIG. 17;

FIG. 23 is a perspective view of the apparatus illustrated in FIG. 17 with the turbine (FIG. 22) removed from the water column tube of the apparatus; and FIG. 24 is a perspective view of a typical impeller for the turbine of the apparatus illustrated in FIG. 17.

Like reference numerals refer to like parts throughout the various views of the drawings.

DETAILED DESCRIPTION OF THE INVENTION

Figure 1A:
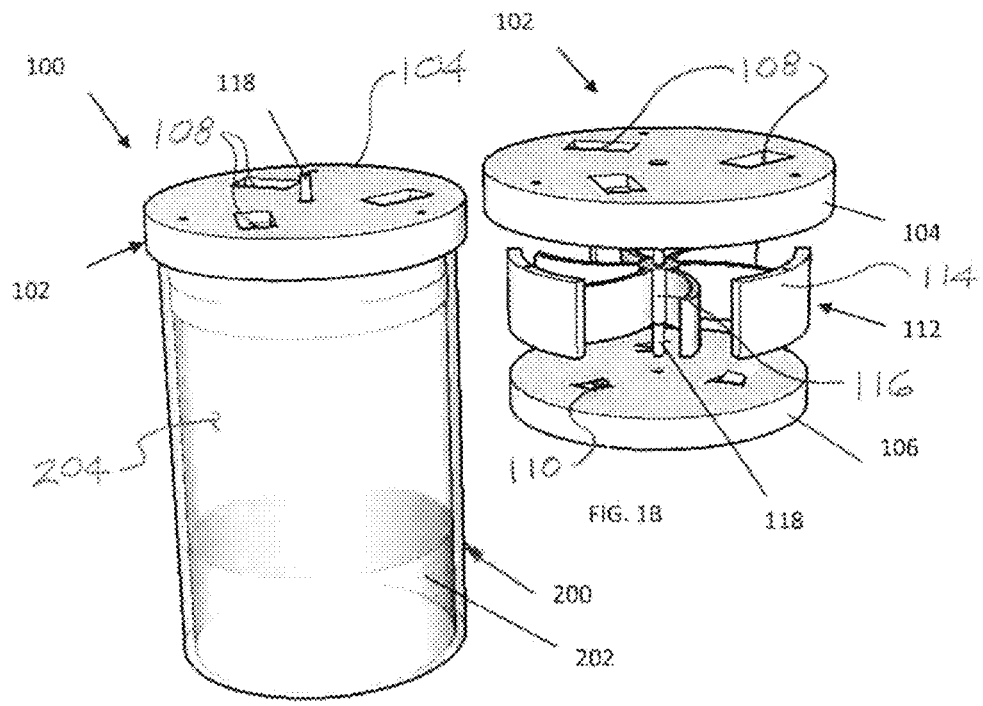
FIG. 1A illustrates a front perspective view of an exemplary oscillating water column turbine apparatus, in accordance with an illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, summary, or the following detailed description. Also, the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Referring initially to FIGS. 1A-3B of the drawings, an illustrative embodiment of the oscillating water column turbine apparatus for generating electricity from an oscillating water column, hereinafter apparatus 100, is illustrated. In typical application, the apparatus 100 may be deployed in an ocean, lake, river, or other body of water (not illustrated) and utilize the oscillating or flowing motion of the water to generate electrical power. The apparatus 100 may include a water cylinder 200 and a turbine 102 disposed in the water cylinder 200. The water cylinder 200 may include a cylinder housing 204. The cylinder housing 204 may be elongated and cylindrical. In some embodiments, the cylinder housing 204 of the water cylinder 200 may have open bottom and top or front and rear, ends. A water piston 202 may be slidably disposed in the cylinder housing 204. The water piston 202 may be slidable between a typically bottom or front first position and a typically top or rear second position in the cylinder housing 204 typically in response to entry and exit of ocean, lake, stream, or other water in a water body into and from the open bottom or front end of the cylinder housing 204. As the water enters the bottom or front end of the cylinder housing 204, air may be expelled from the cylinder housing 204 as the water piston 202 deploys from the first position to the second position. As the water subsequently exits the bottom or front end of the cylinder housing 204, the water piston 202 may return from the second position to the first position, thereby creating negative pressure which draws air into the cylinder housing 204 through the turbine 102, thus rotating the turbine 102 to facilitate generation of electrical power and/or perform other work.

In some embodiments, the turbine 102 of the apparatus 100 may include an inlet cap 104. The inlet cap 104 may be sized and configured to sealingly engage the open top or rear end of the cylinder housing 204. An outlet cap 106 may be disposed in spaced-apart relationship to the inlet cap 104. The outlet cap 106 may be sized and configured to fit inside and sealingly engage the interior surface of the cylinder housing 204. In typical application of the apparatus 100, which will be hereinafter described, the turbine 102 may be oriented vertically with the inlet cap 104 disposed above the outlet cap 106. The apparatus 100 may be bidirectional in operation. Accordingly, in other applications of the apparatus 100, however, the inlet cap 104 may be disposed beneath the outlet cap 106. In still other applications, the turbine 102 may be oriented horizontally in in a sloped configuration with the inlet cap 104 in front of the outlet cap 106, or vice-versa.

An impeller shaft 118 may coaxially extend between the inlet cap 104 and the outlet cap 106. An impeller 112 may be rotatably mounted on the impeller shaft 118. Accordingly, the impeller shaft 118 may mount the impeller 112 for rotation between the inlet cap 104 and the outlet cap 106.

In some embodiments, the impeller 112 may include an impeller hub 116. Multiple impeller blades 114 may extend from the impeller hub 116. According to an exemplary embodiment, the impeller 112 may include six impeller blades 114, though it is not limited to use only six blades. In some embodiments, the impeller hub 116 of the impeller 112 may be journaled for rotation on or with respect to the impeller shaft 118 according to the knowledge of those skilled in the art. In some embodiments, the impeller shaft 118 may be configured to rotate with the impeller hub 116 of the impeller 112. The impeller hub 116 and/or the impeller shaft 118 may be coupled to an electrical generator (not illustrated) which generates electrical power responsive to rotation of the impeller 112.

In some embodiments, the inlet cap 104 may include three inlets 108 that are 120 degrees apart with respect to each other around the circumference of the inlet cap 104. The outlet cap 106 may include three outlets 110 that are 120 degrees apart with respect to each other around the circumference of the outlet cap 106. The inlets 108 and the outlets 110 are designed in such a way as to compress, channel, and exert air pressure against the impeller blades 114 of the impeller 112 as water enters the bottom end of the cylinder housing 204 and displaces the water piston 202 from the lower position to the upper position in the cylinder housing 204. In some embodiments, the inlet cap 104 and the outlet cap 106 may be similar or identical to each other in size, with the inlets 108 in the outlet cap 106 and the outlets 110 in the inlet cap 104 pointed or oriented in opposite directions. The inlets 108 and the outlets 110 may be the same in volume, and therefore, configured to balance the air pressure entering or exiting the turbine 102 while rotating the impeller 112 in a single direction. In some embodiments, if the vacuum side is less responsive than the positive pressure side of the impeller 112, the size and shape of the inlets 108 and the outlets 110 can be adjusted in volume to compensate for that small inadequacy. It will be recognized and understood that alternative configurations are possible, with different numbers of inlets 108 and outlets 110 oriented at different degree spacings with respect to each other.

In some embodiments, the impeller 112 may be a scroll style impeller having six curved impeller blades 114, wherein three inlets 108 and three outlets 110 at inlet cap 104 and the outlet cap 106, respectively, are directed towards the inside curvature, or concave side or surface, of each scroll style impeller blade 114. A blade space 124 may be formed by and between each pair of adjacent impeller blades 114. Each inlet 108 in the inlet cap 104 may be covered or shielded by an adjacent standoff portion 120 at the edge of the inlet cap 104. Each standoff portion 120 may have a 60-degree rotational offset as the impeller 112 revolves through 60-degree increments to allow escape of air from between the standoff portions 120. Each blade space 124 between each adjacent pair of impeller blades 114 of the impeller 112 can only be occupied by or disposed in fluid communication with either one inlet 108 in the inlet cap 104 or one outlet 110 in the outlet cap 106 at a time so as to facilitate the pathway for flow of air which pressurizes the impeller blades 114 and rotates the impeller 112. Any number of inlets 108 and outlets 110 with twice the number of impeller blades 114 of the impeller 112 with a related angle of separation and standoff size can work with the design disclosed herein without departing from the scope and spirit of the invention.

One aspect of an apparatus 100 for generating electricity from an oscillating water column as shown in FIG. 1, wherein the apparatus 100 comprises:
  a water cylinder 200 including:
    a cylinder housing 204; and
    a water piston 202 slidably disposed in the cylinder housing 204, the water piston 202 configured to slide between a first position and a second position in the cylinder housing 204 in response to oscillation of water in the cylinder housing 204, thereby creating a pressure difference to allow pressurized air to enter into and/or escape from the cylinder housing 204; and a turbine 102 including:

an inlet cap 104 supported by the cylinder housing 204 of the water cylinder 200, the inlet cap 104 having "n" number of inlets 108;

an outlet cap 106 disposed in spaced-apart relationship to the inlet cap 104 in the cylinder housing 204, the outlet cap 106 having "n" number of outlets 110;

an impeller shaft 118 coaxially connecting the inlet cap 104 and the outlet cap 106; and an impeller 112 rotatably supported by the impeller shaft 118, the impeller 112 having "2n" number of curved impeller blades 114, wherein the impeller 112 is rotatably sandwiched between the inlet cap 104 and the outlet cap 106, further only one inlet 108 or one outlet 110 is configured to position at space between two adjacent impeller blades 114 for facilitating air pressure to enter and/or escape in a direction towards an inside curvature of the impeller blades 116; and wherein the pressure difference allowing the pressurized air to enter and/or escape from the cylinder housing 204 of the water cylinder rotates the impeller 112 of the turbine 102 to facilitate generation of electrical current.

In another aspect, the impeller 112 of the apparatus 100 may be a scroll style impeller having six impeller blades 114.

In another aspect, the inlet cap 104 of the apparatus 100 may include three inlets 108, 120 degrees apart from each other.

In another aspect, the outlet cap 106 of the apparatus 100 may include three outlets 110, 120 degrees apart from each other.

In another aspect, the inlet cap 104 of the apparatus 100 may further include three standoffs 120 having 60-degree rotational offsets.

In another aspect, the outlet cap 106 may further include three indentations 122 having 60-degree rotational offsets.

One objective of the present invention is to provide an apparatus 100 suitable for generating electricity and/or performing other work from an oscillating water column.

Another objective is to provide an apparatus 100 comprising a turbine 102 which may have only four parts, and thus, easy, and less expensive to manufacture and maintain.

Yet another objective is to provide an apparatus 100 suitable for generating electricity and/or performing other work from an oscillating water column that is not restricted to areas where only large surf is available but it also operational in low tide areas.

Yet another objective is to provide an apparatus 100 suitable for generating electricity and/or performing other work from an oscillating water column that may produce a greater amount of wattage, at a lower cost per watt, than other existing systems.

Yet another objective is to provide an apparatus 100 suitable for generating electricity and/or performing other work from an oscillating water column that may be simple and easily scalable, easier to transport and assemble.

Yet another objective is to provide an apparatus 100 suitable for generating electricity and/or performing other work from an oscillating water column in remote areas where there may be little or no access to an electrical grid.

Yet another objective is to provide an apparatus 100 that generates electricity and/or performs other work from tidal waves, wherein the generated electricity can be used to aid in desalination of sea water to meet the need of fresh water.

According to some embodiments, FIG. 1A illustrates an apparatus 100 suitable for generating electricity and/or performing other work from an oscillating water column, wherein the apparatus 100 comprises a water cylinder 200 having a cylinder housing 204 with an open bottom or front end, a water piston 202 slidably disposed in the cylinder housing 204 and a turbine 102 disposed in the cylinder housing 204 above, adjacent to or behind the water piston 202. The water piston 202 may be insertable into the cylinder housing 204 of the water cylinder 200 through the open bottom or front end of the water cylinder 200, wherein the water piston 202 is configured to oscillate inside the water cylinder 200 and facilitate flow of pressurized air through the turbine 102 in response to the oscillation of the water column in the cylinder housing 204. The turbine 102 may be attached to the top or rear end of the cylinder housing 204 of the water cylinder 200. An impeller shaft 118 may project from the turbine 102. In some applications, the impeller hub 116 and/or the impeller shaft 118 can be coupled to an electrical generator (not shown) to generate electricity when the turbine 102 rotates in response to the air pressure generated resulting from the oscillation of the water piston 202 in the cylinder housing 204. In some applications, the impeller hub 116 and/or the impeller shaft 118 can additionally or alternatively be coupled to a system configured to perform other work according to the knowledge of those skilled in the art.

According to some embodiments, FIG. 1B illustrates typical arrangement of the components of the turbine 102. The turbine 102 may include the inlet cap 104, the outlet cap 106, and the impeller 112 coaxially and rotatably sandwiched between the inlet cap 104 and the outlet cap 106 on the impeller shaft 118.

Figure 2A:
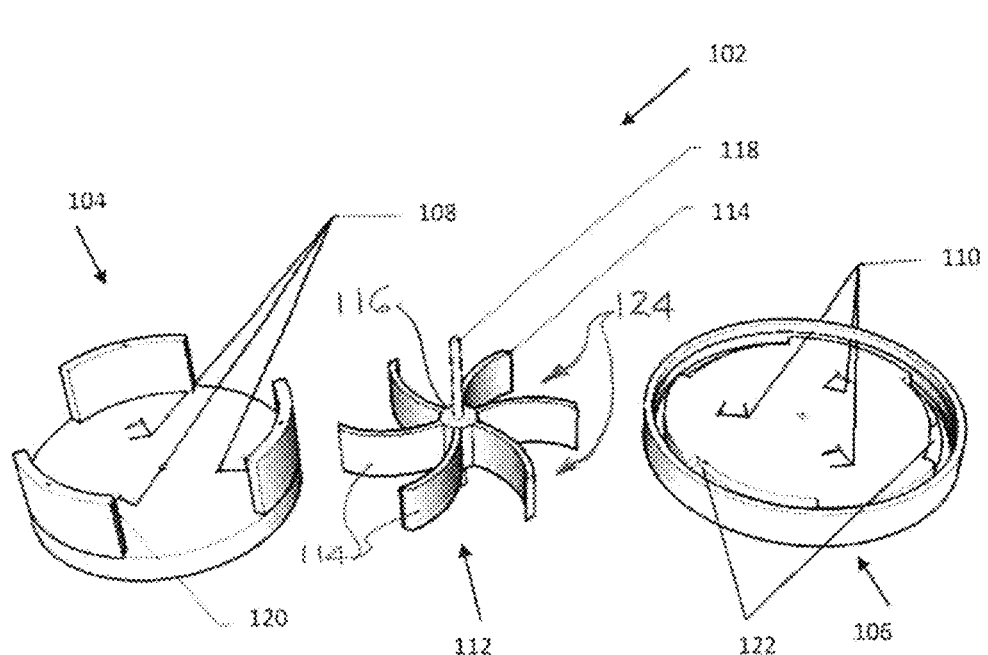
FIG. 2A illustrates a top perspective exploded view of the turbine as shown in FIG. 1B.

According to some embodiments, FIG. 2A illustrates a typically top exploded perspective view of the turbine 102. The inlet cap 104 may include three inlets 108. The inlets 108 may be positioned 120 degrees apart with respect to each other. Further, the inlet cap 104 may include 3 standoffs 120 having 60-degree rotational offsets. The outlet cap 106 may include three outlets 110. The outlets 110 may be positioned 120 degrees apart from each other. Further, the outlet cap 106 may include 3 indentations 122 having 60-degree rotational offset to each other.

Figure 2B:
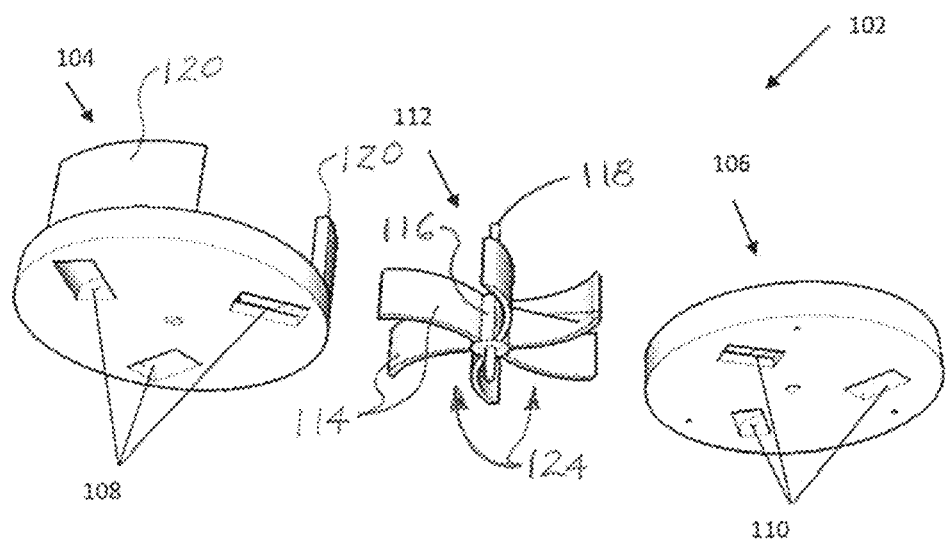
FIG. 2B illustrates a bottom perspective exploded view of the turbine as shown in FIG. 1B.

According to some embodiments of the present invention, FIG. 2B illustrates a typically bottom perspective exploded view of the turbine 102, showing the inlets 108 and the outlets 110 in the respective inlet cap 104 and outlet cap 106.

Figure 3A:
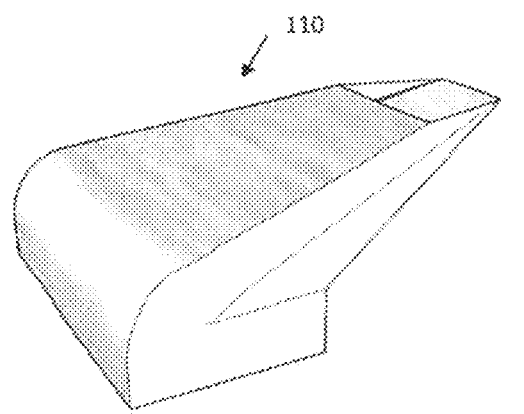
FIG. 3A illustrates a top perspective view of a typical outlet of the turbine as shown in FIG. 2B.
Figure 3B:
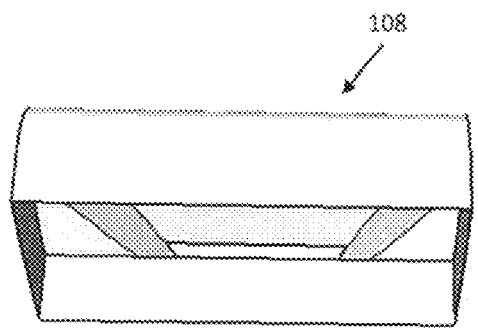
FIG. 3B illustrates a bottom perspective view of a typical inlet of the turbine as shown in FIG. 2B.

According to some embodiments of the present invention, FIG. 3A illustrates an exemplary design of the top or inlet perspective view of each outlet 110 in the outlet cap 106. FIG. 3B illustrates an exemplary design of the bottom or outlet perspective view of the inlet 108. The special configuration of the inlets 108 and outlets 110 may facilitate spiraling and directing of air towards the concave side of the curvature of the impeller blades 116 (shown in FIG. 2A) to aid in the rotation of the impeller 112. This method may enable the usage of lower pressures to drive the turbine 102, thus working in all ocean areas, versus areas with only high wave conditions.

According to some embodiments, the apparatus 100 may facilitate extraction of energy from ocean waves and swells. It may be primarily configured or adapted for OWC (Oscillating Water Columns), though it can also be adapted for and used underwater with oscillating current flows. Further, the apparatus 100 could also be used for desalination, and harvesting of minerals/metals from saltwater, and/or producing green hydrogen. The impeller shaft 118 may rotate in the same direction irrespective of the direction of water flow through the impeller 112.

Figure 4:
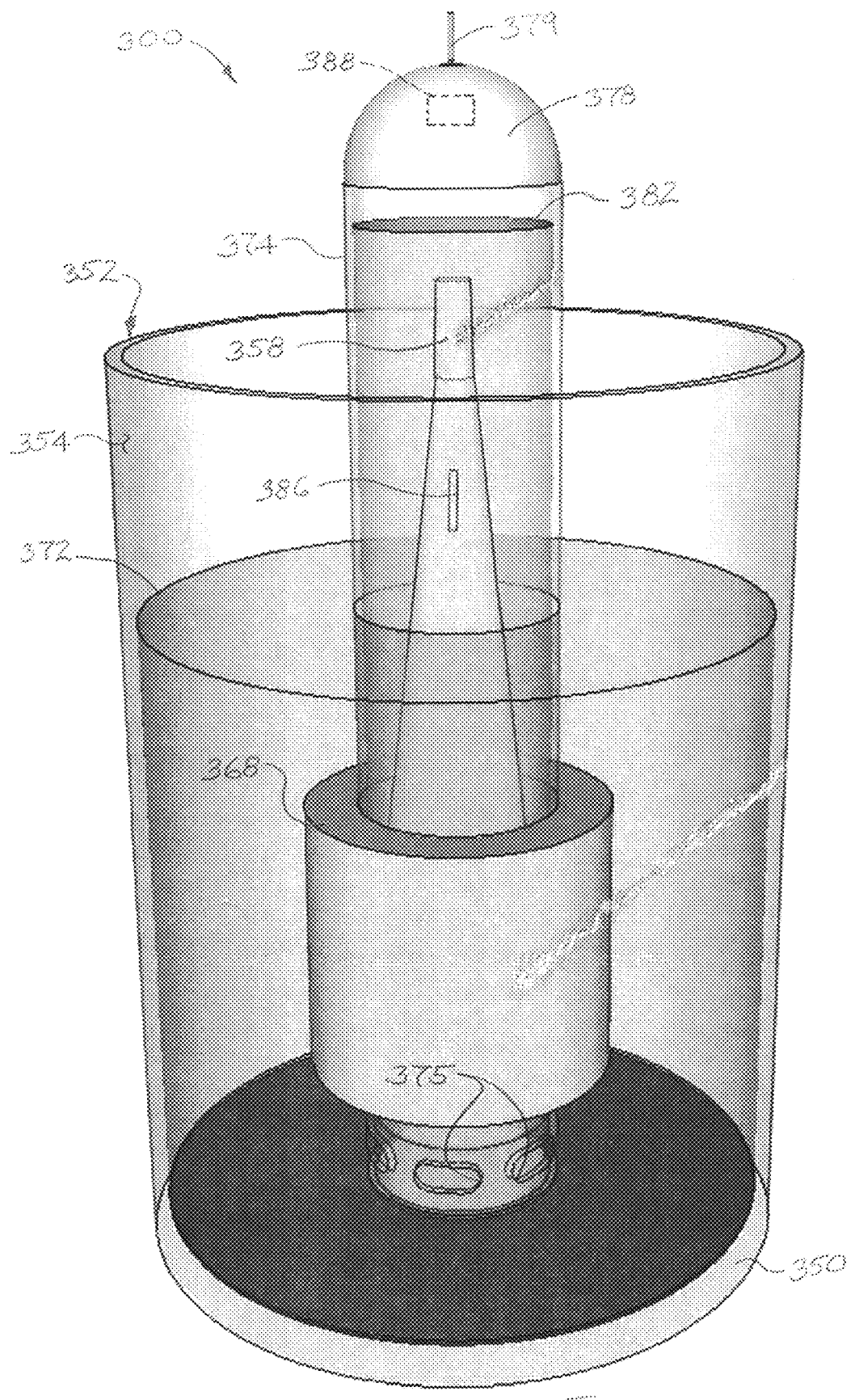
FIG. 4 is a perspective view of an exemplary hydrogen oscillating water column (OWC) turbine apparatus, in accordance with an alternative illustrative embodiment of the present invention, with an inlet water column in a water cylinder of the apparatus and a working water column in a water column tube of the apparatus in typical application of the apparatus.
Figure 5:
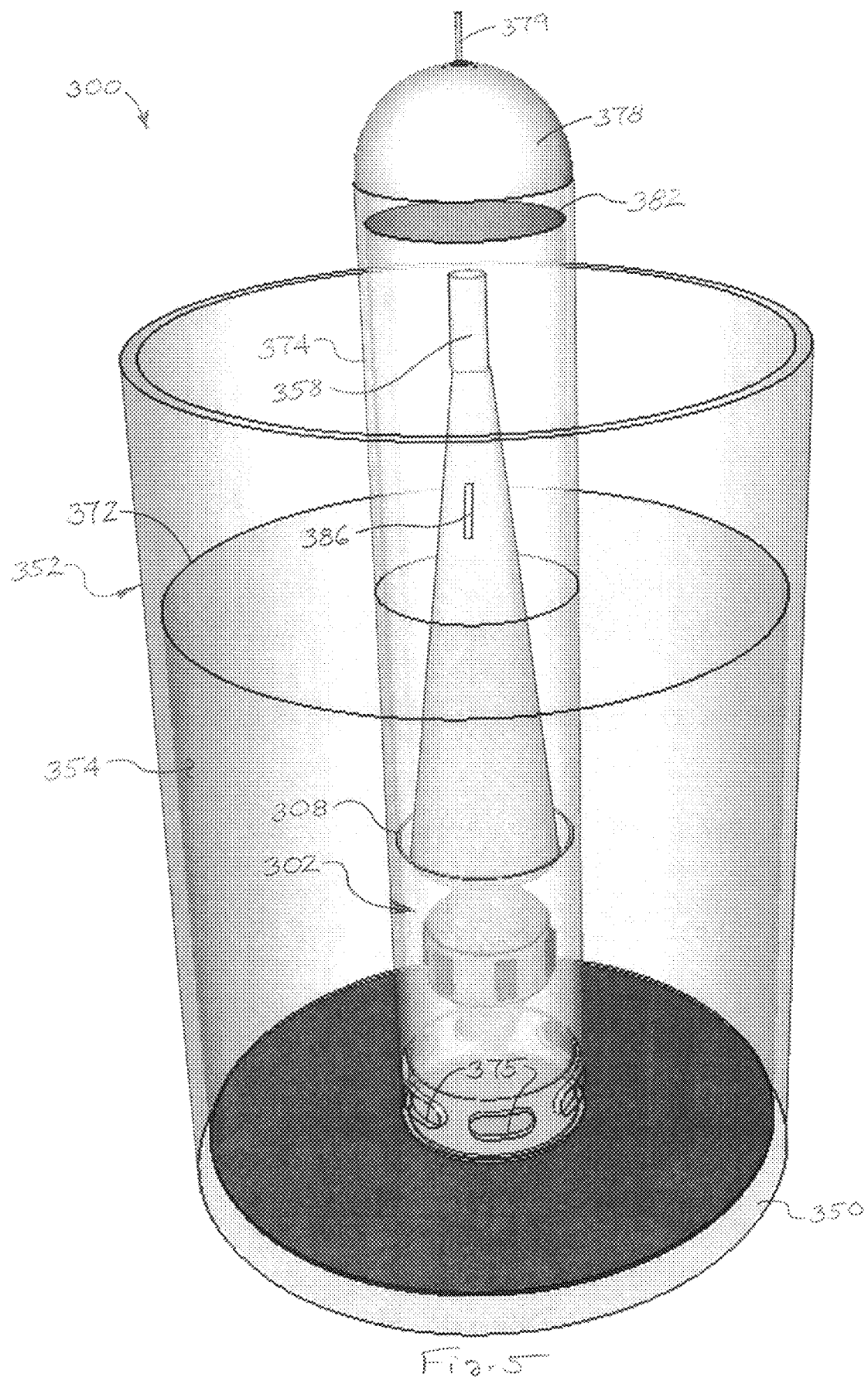
FIG. 5 is a perspective view of the illustrative apparatus illustrated in FIG. 4, with the battery of the apparatus omitted to reveal a typical turbine in the water column tube of the apparatus.

Referring next to FIGS. 4-10 of the drawings, an exemplary hydrogen oscillating water column (OWC) turbine apparatus, hereinafter apparatus, in accordance with an alternative illustrative embodiment of the present invention is indicated by reference numeral 300. As illustrated in FIGS. 4 and 5, the apparatus 300 may include a water cylinder 352. The water cylinder 352 may include a cylinder housing 354. In some applications, an apparatus base 350 may close the bottom or front end of the cylinder housing 354.

A water column tube 374 may be disposed in the cylinder housing 354 of the water cylinder 352. In some embodiments, the water column tube 374 may be centrally disposed in the cylinder housing 354. At least one, and typically, a plurality of water inlet openings 375 may be provided in the lower end of the water column tube 374. The water inlet openings 375 may establish fluid communication between the interior of the cylinder housing 354 and the interior of the water column tube 374.

A hydrogen dome 378 may be provided on the upper end of the water column tube 374. At least one spark generating device 388 (illustrated in phantom in FIG. 4) may be provided in the hydrogen dome 378. The spark generating device 388 may include electrodes and/or other components, elements, and/or devices capable of generating a spark using an electrical current. An exhaust valve 379 may extend from the hydrogen dome 378 typically for purposes which will be hereinafter described. As illustrated in FIG. 5, a turbine 302 may be disposed in the water column tube 374.

In typical application, which will be hereinafter described, the apparatus 300 may be deployed vertically in an, lake, river, or other water body having oscillating water. The cylinder housing 354 of the water cylinder 352 may receive water and air or fluid, hereinafter water, from the water body. The water from the water body may enter and form an inlet water column 372 in the cylinder housing 354. A portion of the water from the inlet water column 372 may enter the water column tube 374 typically through the water inlet openings 375 and form a working water column 382 in the water column tube 374.

Oscillation of the working water column 382 in the water column tube 374 may be affected by facilitating an explosion mixture of hydrogen and oxygen, derived by electrolysis, in the hydrogen dome 378. Hydrogen and oxygen bubbles resulting from the electrolysis may rise in the working water column 382, becoming trapped in the hydrogen dome 378. Once the correct ratios of hydrogen and oxygen in the hydrogen dome 378 are attained, a spark may be formed by actuation of the spark generating device 388 (FIG. 4) in the hydrogen dome 378 to ignite the hydrogen/oxygen mixture. The resulting explosion may force the working water column 382 downwardly through the turbine 302 to actuate the turbine 302. The turbine 302 may be harnessed to generate electrical power and/or perform other work. For example, and without limitation, in some applications, the turbine 302 may be configured to drive a scroll compressor (not illustrated) which injects air into the areas of the apparatus 300 that need to remain dry throughout deployment. In some applications, the generated electrical power may be stored in at least one battery 368 (FIG. 4) which may electrically interface with the turbine 302. The battery 368 may surround or encircle the turbine 302 outside the water column tube 374. The electrical energy stored in the battery 368 may be used to recharge submerged drones (not illustrated), for example and without limitation.

As illustrated in FIGS. 6 and 7, the turbine 302 may include an inlet cap 304 and an outlet cap 306. An impeller assembly 311 may include an impeller 312 which is disposed for rotation between the inlet cap 304 and the outlet cap 306 responsive to movement of the working water column 382 (FIGS. 4 and 5) in the water column tube 374, as will be hereinafter further described. The impeller 312 may include multiple impeller magnets 316. As illustrated in FIG. 8, in some embodiments, the impeller 312 of the impeller assembly 311 may be mounted for rotation on an impeller shaft 318.

A stator 322 may be disposed exterior to the impeller 312. The stator 322 may include multiple stator magnets 323. The stator magnets 323 of the stator 322 may include copper coils which magnetically interface sequentially with the impeller magnets 316 of the impeller 312 as the impeller 312 rotates and the stator 322 remains stationary with respect to the impeller 312. Accordingly, as the impeller magnets 316 of the impeller 312 sequentially interface magnetically with the stator magnets 323 of the stator 322, the stator magnets 323 may be configured to generate electrical power which may be stored in the battery 368 for use. In some embodiments, each of the impeller magnets 316 and the stator magnets 323 may include neodymium magnets.

In some embodiments, the impeller assembly 311 of the turbine 302 may include an inner inlet funnel cone 358 which tapers from the inlet cap 304. In some embodiments, the inner inlet funnel cone 358 may be titanium and/or other material or materials which resist salt decay and heat exposure. An outer inlet funnel cone 359 may be disposed outside the inner inlet funnel cone 358. The inner inlet funnel cone 358 and the outer inlet funnel cone 359 may be configured to direct flow of water in the working water column 382 through the inlet cap 304, the impeller 312 and the outlet cap 306, respectively, as the working water column 382 is driven downwardly in the water column tube 374.

At least one typically carbon electrolysis electrode 386 may be provided in the water column tube 374. For example, and without limitation, in some embodiments, the electrolysis electrodes 386 may be provided on the inner inlet funnel cone 358, as illustrated. A source of electrical current (not illustrated) may electrically interface with the electrolysis electrodes 386 for purposes which will be hereinafter described.

An inner outlet funnel cone 360 may taper from the outlet cap 306. An outer outlet funnel cone 361 may be disposed outside the inner outlet funnel cone 360. The inner outlet funnel cone 360 and the outer outlet funnel cone 361 may be configured to direct flow of water in the working water column 382 through the outlet cap 306, the impeller 312 and the inlet cap 304, respectively, typically as the working water column 382 rises in the water column tube 374.

As illustrated in FIG. 5, in some embodiments, a turbine housing 308 may be disposed in the water column tube 374. As illustrated in FIGS. 5, 7 and 8, the inlet cap 304, the outlet cap 306, the impeller 312, the stator 322, the inner inlet funnel cone 358, the outer inlet funnel cone 359, the inner outlet funnel cone 360 and the outer outlet funnel cone 361 of the impeller assembly 311 may be contained in the turbine housing 308. Accordingly, the turbine housing 308 may be configured for removal from the water column tube 374 with the components of the impeller assembly 311 contained therein for repair, maintenance and/or replacement of the components.

As illustrated in FIG. 8, in some embodiments, the impeller 312 of the impeller assembly 311 may include an annular inner impeller wall 313. An impeller interior 317 may be formed by the inner impeller wall 311. The impeller interior 317 may facilitate use of the impeller 312 as a rotor/bldc motor for salt water pumping and desalination applications. An annular outer impeller wall 314 may be disposed inside and in concentric and spaced-apart relationship to the inner impeller wall 313. Multiple impeller blades 315 may span or extend between the inner impeller wall 313 and the outer impeller wall 314. Each impeller blade 315 may have a concave curvature which faces the convex curvature of the adjacent impeller blade 315. According to an exemplary embodiment, the impeller 312 may include six impeller blades 315, though it is not limited to use only six impeller blades 315. The impeller magnets 316 may be provided on the exterior surface of the outer impeller wall 314 of the impeller 312. As illustrated in FIG. 8, at least one bearing race 326 may be disposed between the inner impeller wall 313 of the impeller 312 and the impeller shaft 318.

As illustrated in FIG. 9A, in some embodiments, the inlet cap 304 of the turbine 302 may include an inlet cap body 330. The inlet cap body 330 may include an inner hub portion 331 and an outer rim portion 332. A shaft opening 339 may extend through the hub portion 331. The shaft opening 339 may be sized and configured to accommodate the impeller shaft 318. A shaft bearing 338 may be disposed in the shaft opening 339 to receive and engage the impeller shaft 318.

Multiple inlets 333 may extend through the rim portion 332 of the inlet cap body 330. As illustrated in FIG. 9A, in some embodiments, the inlet cap 304 may include three inlets 333 that are 120 degrees apart with respect to each other around the circumference of the inlet cap body 330. Each inlet 333 may have an elongated, curved, slotted shape with a first inlet end 334 and a second inlet end 335. The first inlet end 334 of each inlet 333 may be disposed adjacent to the second inlet end 335 of the adjacent inlet 333.

An inlet ramp 336 may be disposed in each inlet 333. Each inlet ramp 336 may slope within the corresponding inlet 333 from the first inlet end 334 toward the second inlet end 335 of the inlet 333. The inlet ramp 336 may traverse at least a portion of the thickness of the inlet cap body 330 from the outer surface (the surface proximate the inner inlet funnel cone 358) to the inner surface (the surface proximate the impeller 312) of the hub portion 331. An inlet opening 337 may be formed by and between the extending or distal end of the inlet ramp 336 and the second inlet end 335 of the inlet 333.

As illustrated in FIG. 9B, in some embodiments, the outlet cap 306 of the turbine 302 may include an outlet cap body 340. The outlet cap body 340 may include an inner hub portion 341 and an outer rim portion 342. A shaft opening 349 may extend through the hub portion 341. The shaft opening 349 may be sized and configured to accommodate the impeller shaft 318. A shaft bearing 348 may be disposed in the shaft opening 349 to receive and engage the impeller shaft 318.

Multiple outlets 343 may extend through the rim portion 342 of the outlet cap body 340. In some embodiments, the outlet cap 306 may include three outlets 343 that are 120 degrees apart with respect to each other around the circumference of the outlet cap body 340. Each outlet 343 may have an elongated, curved, slotted shape with a first outlet end 344 and a second outlet end 345. The first outlet end 344 of each outlet 343 may be disposed adjacent to the second outlet end 345 of the adjacent outlet 343.

An outlet ramp 346 may be disposed in each outlet 343. Each outlet ramp 346 may slope within the corresponding outlet 343 from the first outlet end 344 toward the second outlet end 345 of the outlet 343. The outlet ramp 346 may traverse at least a portion of the thickness of the outlet cap body 340 from the outer surface (the surface proximate the inner outlet funnel cone 360) to the inner surface (the surface proximate the impeller 312) of the hub portion 341. An outlet opening 347 may be formed by and between the extending or distal end of the outlet ramp 346 and the second outlet end 345 of the outlet 343.

The inlets 333 of the inlet cap 304 and the outlets 343 of the outlet cap 306 may be directed towards the inside curvature, or concave side or surface, of each impeller blade 315. Accordingly, the inlets 333 of the inlet cap 304 and the outlets 343 of the outlet cap 306 may be designed in such a way as to compress, channel, and exert water pressure against the impeller blades 315 of the impeller 312 as water from the inlet water column 372 enters the bottom end of the water column tube 374 typically through the water inlet openings 375 and the resulting working water column 382 is subsequently forced downwardly in the working water column 382 by explosion of the hydrogen/oxygen mixture in the hydrogen dome 378. In some embodiments, the inlet cap 304 and the outlet cap 306 may be similar or identical to each other in size, with the inlets 333 in the inlet cap 304 and the outlets 343 in the outlet cap 306 pointed or oriented in opposite directions. The inlets 333 and the outlets 343 may be the same in volume, and therefore, configured to balance the pressure of the water entering or exiting the turbine 302 while rotating the impeller 312 in a single direction. In some embodiments, if the vacuum side is less responsive than the positive pressure side of the impeller 312, the size and shape of the inlets 333 and the outlets 343 can be adjusted in volume to compensate for that small inadequacy.

In some embodiments, the impeller 312 may be a scroll style impeller having six curved impeller blades 315, wherein three inlets 333 and three outlets 343 in the inlet cap 304 and the outlet cap 306, respectively, are directed towards the inside curvature, or concave side or surface, of each scroll style impeller blade 315. As illustrated in FIG. 8, a blade space 324 may be formed by and between each pair of adjacent impeller blades 314. Each blade space 324 between each adjacent pair of impeller blades 315 of the impeller 312 can only be occupied by or disposed in fluid communication with either one inlet 333 in the inlet cap 304 or one outlet 343 in the outlet cap 306 at a time so as to facilitate the pathway for flow of water which pressurizes the impeller blades 315 and rotates the impeller 312. Any number of inlets 333 and outlets 343 with twice the number of impeller blades 315 of the impeller 312 with a related angle of separation and standoff size can work with the design disclosed herein without departing from the scope and spirit of the invention. The inlet ramps 336 in the respective inlets 333 of the inlet cap 304 may be oriented to direct or funnel the water from the downwardly moving working water column 382 against the concave surfaces of the impeller blades 315.

In typical application, the apparatus 300 may be deployed vertically in an ocean, lake, river, or other body of water (not illustrated). The apparatus 300 may generate and utilize the oscillating motion of the working water column 382 from the water body to generate electrical power and/or perform work. Accordingly, the apparatus base 350 may be placed on the floor of the water body or in a suitable platform in the water body. Water from the water body may enter the open upper end of the cylinder housing 354 of the water cylinder 352, forming the inlet water column 372 which surrounds the water column tube 374. Water from the inlet water column 372 may initially flow through the water inlet openings 375 in the water column tube 374, forming the working water column 382 which rises in the water column tube 374. The rising water, guided by the inner outlet funnel cone 360 and the outer outlet funnel cone 361, may flow initially through the outlets 343 (FIG. 9B) of the outlet cap 306 and then through the blade spaces 324 between the impeller blades 315 of the impeller 312 and the inlets 333 of the inlet cap 304, respectively. The working water column 382 may continue to rise in the water column tube 374 along the exterior of the inner inlet funnel cone 358.

As the water flows through the impeller assembly 311, the outlet ramps 346 (FIG. 9B) in the respective outlets 343 of the outlet cap 306 may funnel or direct the water through the respective outlet openings 347 against the impeller blades 315 of the impeller 312, thereby rotating the impeller 312. As the impeller magnets 316 on the impeller 312 rotate past and magnetically interface with the stator magnets 323 on the stator 322, the stator magnets 323 may generate electrical current which may be stored in the battery 368 (FIG. 4) for subsequent use, non-limiting examples of which will be hereinafter described.

The working water column 382 in the water column tube 374 may subsequently be oscillated by facilitating an explosion mixture of hydrogen and oxygen derived by electrolysis of the water in the working water column 382. The electrolysis may be facilitated by applying electrical current to the electrolysis electrodes 386. Hydrogen and oxygen bubbles resulting from the electrolysis may rise in the working water column 382, releasing hydrogen and oxygen gas which becomes trapped in the hydrogen dome 378. Once the correct ratios of hydrogen and oxygen in the hydrogen dome 378 are attained, a spark may be formed in the hydrogen dome 378 typically by actuation of the spark generating device 388 (FIG. 4) to ignite the hydrogen/oxygen mixture. The resulting explosion may force the working water column 382 downwardly through the turbine 302 to actuate the turbine 302.

As it is forced downwardly in the water column tube 374, the water, guided by the inner inlet funnel cone 358 and the outer inlet funnel cone 359, may flow first through the inlets 333 of the inlet cap 304 and then through the blade spaces 324 between the impeller blades 315 of the impeller 312 and the outlets 343 of the outlet cap 306, respectively. The downwardly moving water may then flow from the water column tube 374 through the water inlet openings 375 back into the cylinder housing 354 of the water cylinder 352.

As the water flows through the inlets 333 in the inlet cap 304, the inlet ramps 336 may direct the flow of the water through the respective inlet openings 337 and against the concave surfaces of the respective impeller blades 315 of the impeller 312. This action causes the impeller 312 to rotate on the impeller shaft 318. As the impeller magnets 316 on the rotating impeller 312 sequentially magnetically interface with the respective stator magnets 323 on the stationary stator 322, electrical current which is generated may be stored in the battery 368 (FIG. 4). The electrical current may be used for any of various applications such as to recharge submerged drones (not illustrated) for military application, for example and without limitation. In some applications, the mechanical and/or electrical energy generated by the rotating impeller 312 may be used to drive a scroll compressor (not illustrated) which may inject air into the area or areas of the apparatus 300 that need to remain dry.

Because the explosion of the hydrogen/oxygen mixture which drives the working water column 382 downwardly in the water column tube 374 is a measured explosion, the boundary layer of the water may stop short of subjecting the turbine 302 to excessive heat. The energy created by the turbine 302 may then be reapplied to the electrolysis electrodes 386, causing electrolysis to take place once again. When the explosion takes place, the force of the explosion may push the water level of the inlet water column 372 higher than its previous level. This may facilitate a form of energy storage which assists to refill the water column tube 374 with water to form the working water column 382, thus causing actuation of the bi-directional turbine 302. The process is cyclic.

The explosive action of the hydrogen/oxygen mixture in driving the working water column 382 downwardly in the water column tube 374 may impart rocket propulsion forces to the water column tube 374. These forces may be resisted or counteracted by the typically stainless steel and unitary construction of the water column tube 374 with the water cylinder 352 and the weight of the inlet water column 372.

Because explosion of the hydrogen/oxygen mixture is exothermic, the hydrogen dome 378 may require cooling. In some embodiments, this may be accomplished by placing the apparatus 300 in the ocean, river stream, lake, or other water body. In some applications, however, the apparatus 300 may be placed on dry land. A water well (not illustrated) may be used to cool and replenish the water in the inlet water column 372 and the working water column 382.

In applications in which the water body is an ocean, the ocean salt in the water may function as a conductor for electrolysis to take place. In applications in which salt is not naturally available, one or more methods of maintaining the electrolyte may be necessary. This may be accomplished by exposing a block of salt and/or lye, for example and without limitation, which has been engineered to dissolve at a specific rate. Lye acts as an electrolyte and creates a nearly 50% increase in hydrogen/oxygen production. The energy or electrical power for the electrolysis electrodes 386 and/or the spark generating device 388 may be supplied by wind, solar power or the like.

In some embodiments, the hydrogen dome 378 may include the exhaust valve 379 which may be activated by a solenoid (not illustrated). The exhaust valve 379 may be necessary to vent the $NO_x$ gas through a catalytic converter (not illustrated). The $NO_x$ may be a byproduct of burning fossil fuel and is harmful to humans and the environment. The catalytic converter may help to reduce the quantity of $NO_x$ which is released to the atmosphere. It will be appreciated by those skilled in the art that the apparatus 300 leaves no carbon footprint and has the potential of producing green hydrogen which can be pumped onshore for storage.

In some applications, the apparatus 300 may be part of an ocean wave generator, as the open exhaust valve 379 permits air to escape and be pulled back downwards. The apparatus 300 can be used in reverse osmosis applications, which typically requires fluid pressures of 800-1,000 psi.

As illustrated in FIGS. 6-8 and 10, in some embodiments, the turbine 302 may be configured to utilize reverse osmosis for water purification purposes. Accordingly, as illustrated in FIG. 6, a reverse osmosis membrane 310 may be disposed in the hub portion 331 (FIG. 9A) of the inlet cap body 330 of the inlet cap 304. A reverse osmosis membrane 310 may additionally or alternatively be disposed in the hub portion 341 (FIG. 9B) of the outlet cap body 340 of the outlet cap 306. One or more additional reverse osmosis membranes may be provided in the impeller interior 317 (FIG. 8) of the impeller 312.

Figure 10:
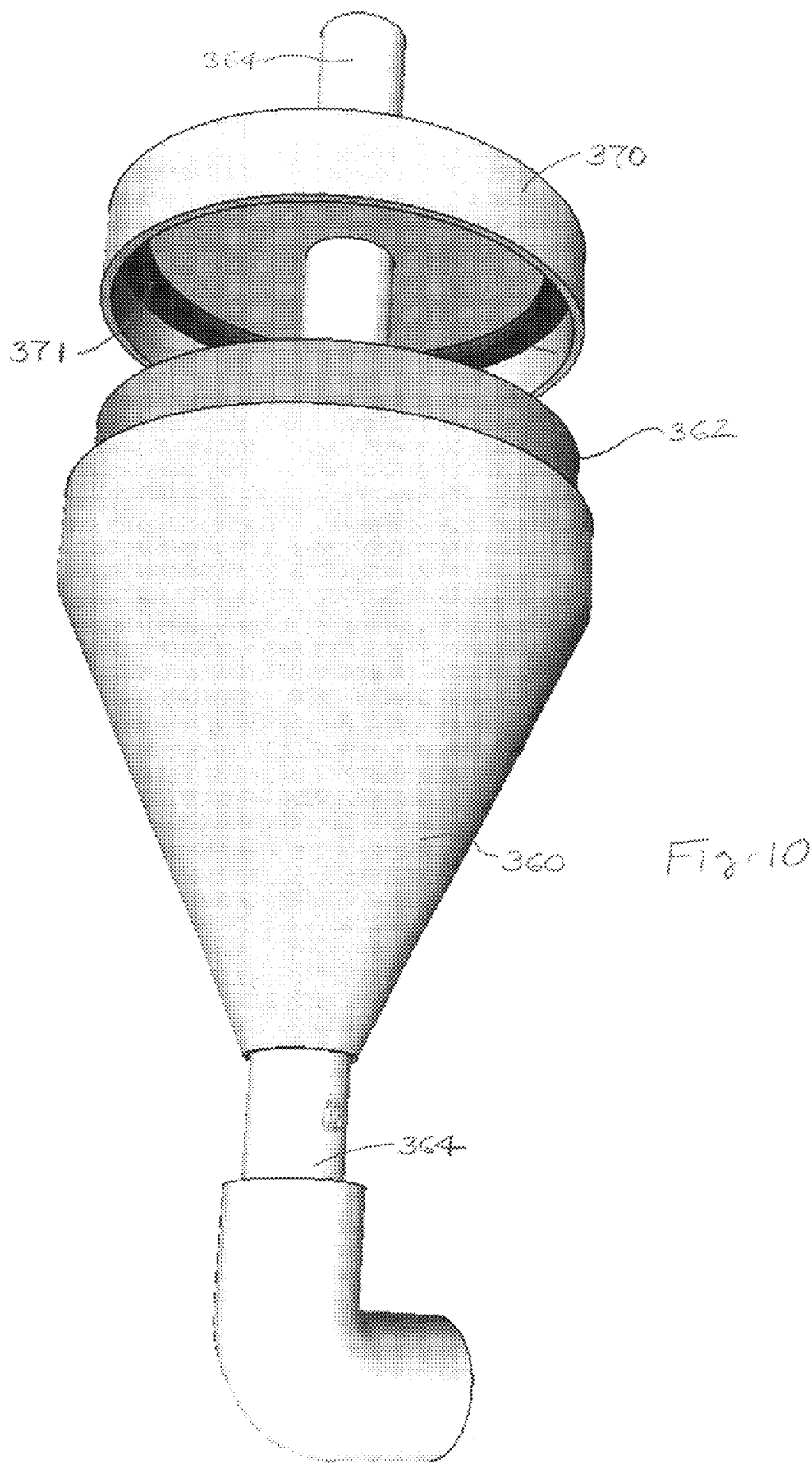
FIG. 10 is a perspective view of a typical inner outlet funnel cone and reverse osmosis outlet cap of the turbine.

A reverse osmosis bottom cap 370 (FIG. 10) for the inner outlet funnel cone 360 may be disposed in fluid communication with the reverse osmosis membrane or membranes 310. A clean water discharge tube 364 may be disposed in fluid communication with the reverse osmosis membranes 310 and the reverse osmosis cap 370. The inner outlet funnel cone 360 may be made of a buoyant material and slidably disposed on the clean water discharge tube 364 to function as a float valve, in which the inner outlet funnel cone 360 is positional in an unsealing lower position, as illustrated, and a sealing upper position. As illustrated in FIG. 10, the inner outlet funnel cone 360 may have a cone seal 362 which sealingly engages a companion cap seal 371 on the reverse osmosis bottom cap 370 in the upper, sealing position of the inner outlet funnel cone 360.

As further illustrated in FIG. 10, the clean water discharge tube 364 may extend through and from the bottom of the inner outlet funnel cone 360. The clean water discharge tube 364 may terminate outside the water cylinder 352 (FIGS. 4 and 5). In some applications, a clean water collection container (not illustrated) may be disposed in fluid communication with the clean water discharge tube 364 for purposes which will be hereinafter described.

As the water flows from the inlet water column 372 in the water cylinder 352 through the water inlet openings 375 and the working water column 382 rises in the water column tube 374, the water may initially flow against the inner outlet funnel cone 360. The rising water may thus float the inner outlet funnel cone 360 from the lower, unsealing position to the raised, sealing position on the clean water discharge tube 364 until the cone seal 362 (FIG. 10) on the inner outlet funnel cone 360 sealingly engages the companion cap seal 371 in the reverse osmosis bottom cap 370. Accordingly, the inner outlet funnel cone 360 may prevent reverse flow of the rising water in the working water column 382 through the reverse osmosis bottom cap 370 and the reverse osmosis membranes 310.

As illustrated in FIGS. 4 and 5, the explosion of the hydrogen/oxygen mixture in the hydrogen dome 378 may force a portion of the working water column 382 in the water column tube 374 downwardly through the inner inlet funnel cone 358 and the reverse osmosis membranes 310 (FIG. 6) in the inlet cap 304, the impeller 312 and/or the outlet cap 306. The water may flow through the reverse osmosis bottom cap 370 (FIG. 10) and the clean water discharge tube 364, respectively, and typically into the clean water collection container (not illustrated). The reverse osmosis membrane 310 and the reverse osmosis cap 370 may remove sand, sediment, salt, and other impurities from the water such that the water is in a purified state as it flows through the clean water discharge tube 364 to the clean water collection container. The inner inlet funnel cone 358 may have an elongated vertical configuration, as illustrated, to dissipate energy from the working water column 382 in the water column tube 374 for protection of the reverse osmosis membrane 310 from damage. The shape and length of the inner inlet funnel cone 358 may depend on degree of water explosion. The apparatus 300 may be capable of bidirectional operation as the impeller 312 of the impeller assembly 311 rotates both as the water flows first through the inlet cap 304 and then through the outlet cap 306, respectively, and vice-versa.

Figure 11:
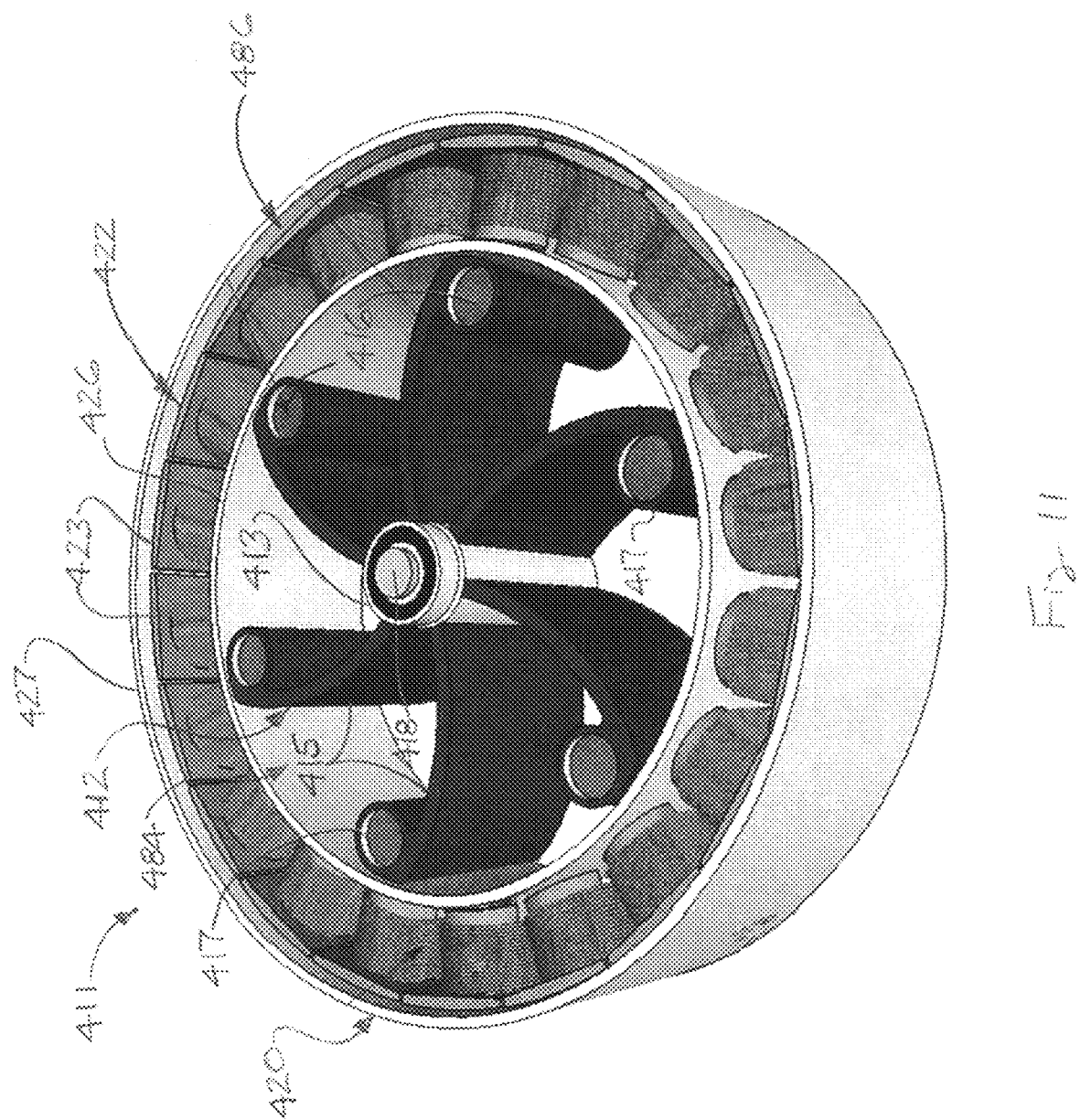
FIG. 11 is a top perspective view of a typical impeller assembly suitable for the turbine of the apparatus illustrated in FIGS. 4-10.
Figure 12:
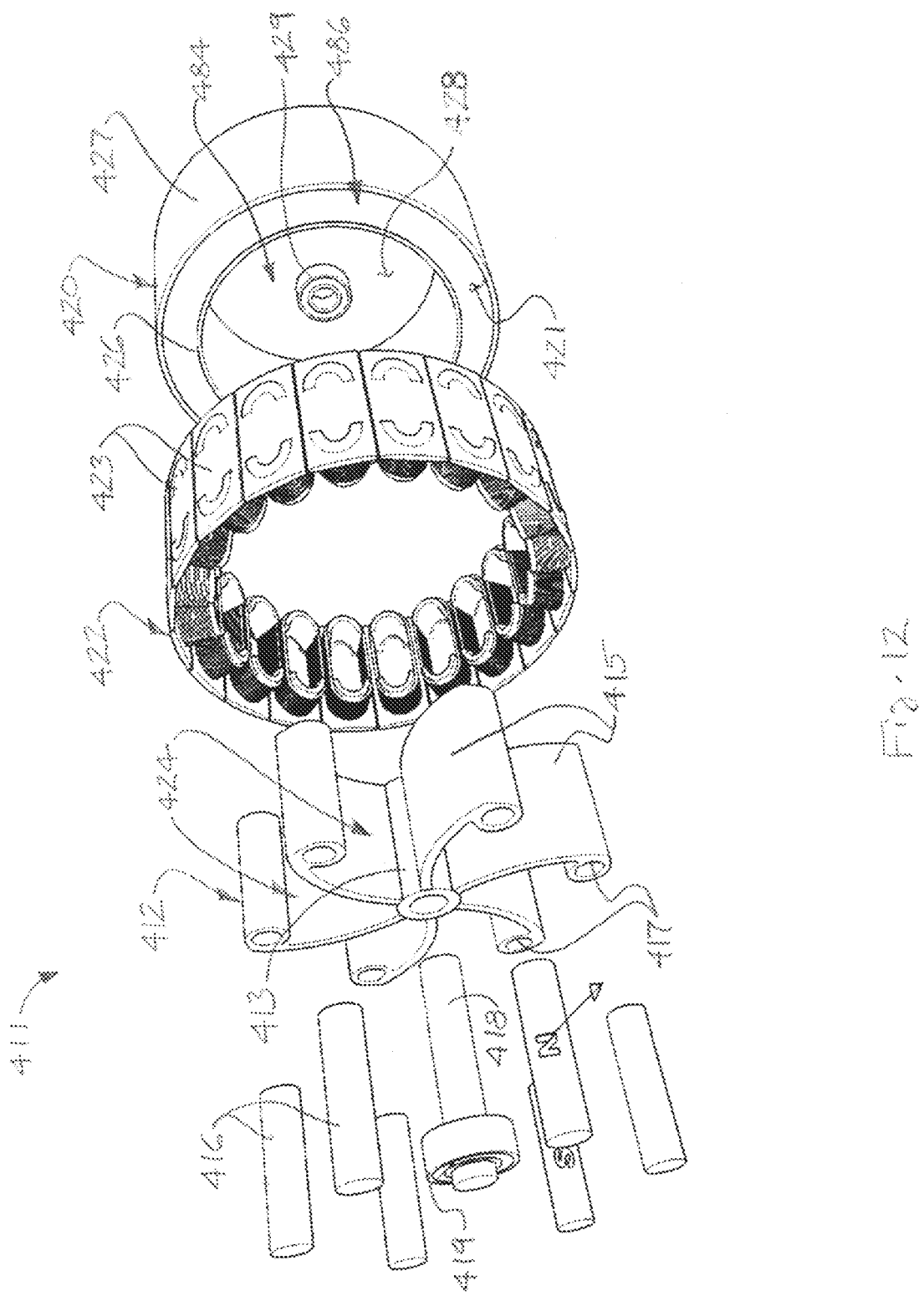
FIG. 12 is an exploded bottom perspective view of the impeller assembly illustrated in FIG. 11.

Referring next to FIGS. 11 and 12 of the drawings, a typical alternative design for an impeller assembly 411 which is suitable for the turbine 302 of the apparatus 300 heretofore described with respect to FIGS. 4-10 is shown. The impeller assembly 411 may function as an electrical generator. Unless otherwise noted, elements which are analogous to the respective elements of the impeller assembly 311 in the apparatus 300 that was heretofore described with respect to FIGS. 4-10 are designated by the same respective numerals in the 400 series for the impeller assembly 411 illustrated in FIGS. 11 and 12. Accordingly, unless otherwise noted, the same description which was heretofore set forth with respect to the impeller assembly 311 of the apparatus 300 is incorporated by reference herein in its entirety with respect to the description of the impeller assembly 411.

The impeller 412 of the impeller assembly 411 may include an assembly containment shell 420. The assembly containment shell 420 may include an inner shell wall 426. An outer shell wall 427 may be disposed outside of and in concentric and spaced-apart relationship to the inner shell wall 426. An impeller cavity 484 may be formed by the inner shell wall 426. A stator cavity 486 may be formed by and between the inner shell wall 426 and the outer shell wall 427. As illustrated in FIG. 12, an end shell wall 428 may close the impeller cavity 484.

The impeller 412 of the impeller assembly 411 may be disposed for rotation in the impeller cavity 484 of the assembly containment shell 420. The impeller 412 may include an impeller hub 413. The impeller hub 413 may be suitably sized and configured to receive the impeller shaft 418, typically with a shaft bearing 419 disposed between the impeller hub 413 and the impeller shaft 418.

Multiple impeller blades 415 with blade spaces 424 therebetween may extend outwardly from the impeller hub 413. Each impeller blade 415 may have a concave curvature which faces the convex curvature of the adjacent impeller blade 415. According to an exemplary embodiment, the impeller 412 may include six impeller blades 415, though it is not limited to use only six impeller blades 415.

At least one impeller magnet 416 may terminate the extending or distal end of each impeller blade 415. In some embodiments, at least one magnet cavity 417 may terminate the impeller blade 415. The impeller magnet or magnets 416 may be provided in the magnet cavity 417. Each impeller magnet 416 may include at least one diametric neodymium magnet, for example and without limitation.

The stator 422 may be provided in the stator cavity 486 of the assembly containment shell 420. The stator 422 may include multiple stator magnets 423 which are disposed in adjacent, spaced-apart relationship to each other around the circumference of the stator cavity 486. Each stator magnet 423 may include copper coils which may electrically interface with the battery 368 (FIG. 4) of the apparatus 300. As illustrated in FIG. 12, a stator encapsulation resin 421 may be provided in the stator cavity 486 between the inner shell wall 426 and the outer shell wall 427 of the assembly containment shell 420.

In typical application, the impeller assembly 411 may be installed as the impeller assembly in the turbine 302 of the apparatus 300 which was heretofore described and illustrated with respect to FIGS. 4-10. Accordingly, the inlet cap 304 and the outlet cap 306 may be disposed at the inlet and outlet sides, respectively, of the impeller 412. As it falls through the inlets 333 of the inlet cap 304, the inlet ramps 336 in the respective inlets 333 direct the water against the concave surfaces of the respective impeller blades 415 of the impeller 412. The water subsequently falls from the blade spaces 424 between the adjacent impeller blades 415 through the outlets 343 in the outlet cap 306. The stator magnets 423 of the stator 422 may magnetically interface sequentially with the impeller magnets 416 of the impeller 412 as the impeller 412 rotates in the impeller cavity 484 and the stator 422 remains stationary with respect to the impeller 412. The stator magnets 423 may thus generate electrical power which may be stored in the battery 368 (FIG. 4) of the apparatus 300 for use. The weight of the impeller magnets 416 on the impeller blades 415 may impart a flywheel effect to the impeller 412 during rotation. The impeller assembly 411 may be capable of bidirectional operation.

Figure 13:
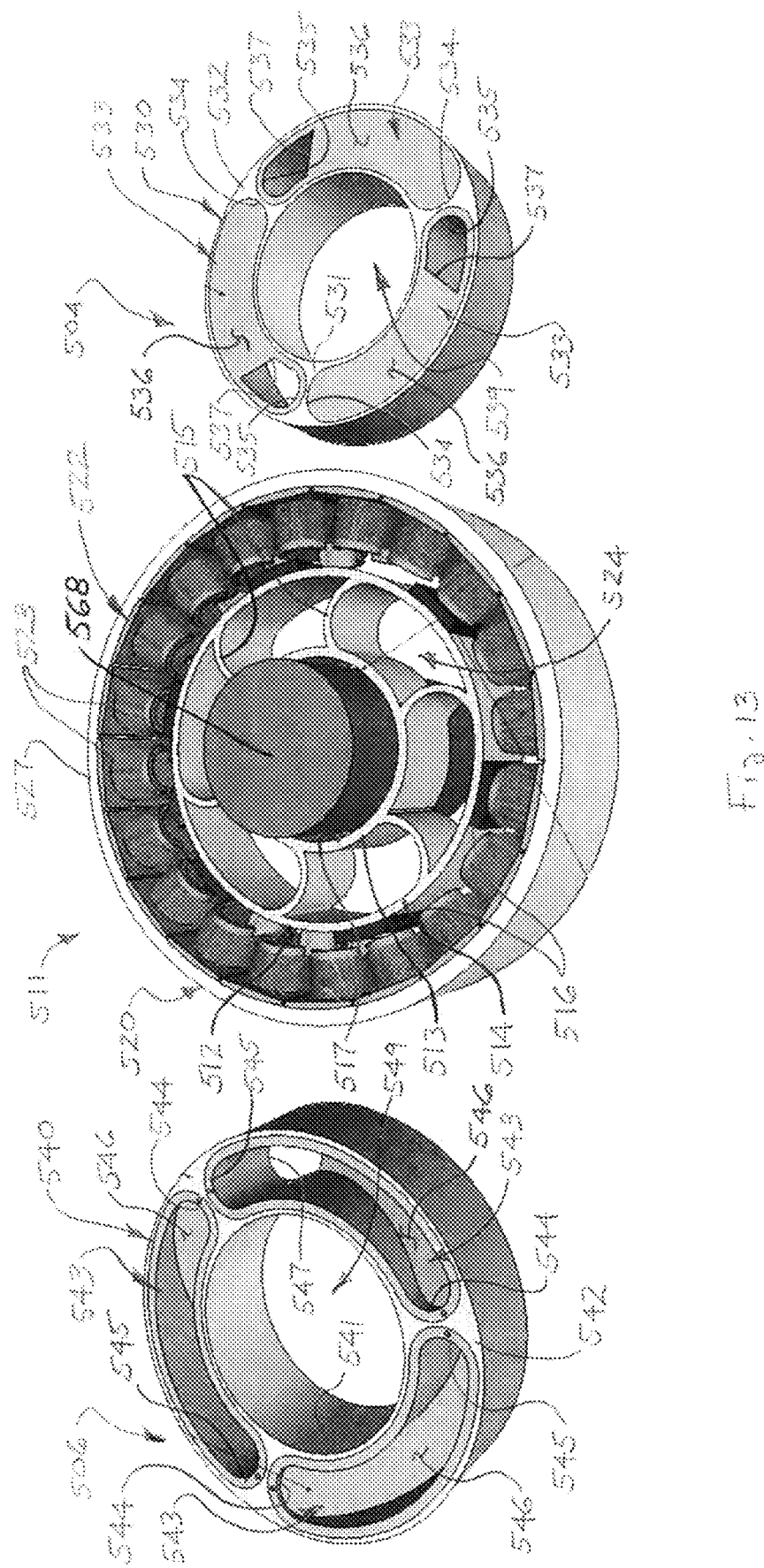
FIG. 13 is an exploded top perspective view illustrating a typical alternative, hollow center design for an impeller assembly with an inlet cap and an outlet cap on opposite sides of the impeller assembly.

Referring next to FIG. 13, another typical alternative hollow center design for an impeller assembly 511 with an inlet cap 504 and an outlet cap 506 on opposite sides of the impeller assembly 511 is illustrated. Unless otherwise noted, elements which are analogous to the respective elements of the inlet cap 304, the outlet cap 306 and the impeller assembly 311 in the apparatus 300 that was heretofore described with respect to FIGS. 4-10 are designated by the same respective numerals in the 500 series for the inlet cap 504, the outlet cap 506 and the impeller assembly 511 illustrated in FIG. 13. Accordingly, unless otherwise noted, the same description which was heretofore set forth with respect to the inlet cap 304, the outlet cap 306 and the impeller assembly 311 of the apparatus 300 is incorporated by reference herein in its entirety with respect to the description of the inlet cap 504, the outlet cap 506 and the impeller assembly 511. The inlets 533 of the inlet cap 504 and the outlets 543 of the outlet cap 506 may be directed towards the inside curvature, or concave side or surface, of each impeller blade 515.

The impeller assembly 511 may include an assembly containment shell 520. The impeller 512 of the impeller assembly 511 may be disposed for rotation in the assembly containment shell 520. The stator 522 may be disposed between the impeller 512 and the interior surface of the assembly containment shell 520.

The impeller 512 of the impeller assembly 511 may include an annular inner impeller wall 513. An impeller interior 517 may be formed by the inner impeller wall 513. The impeller interior 517 may facilitate use of the impeller 512 as a rotor/bldc motor for salt water pumping and desalination applications. An annular outer impeller wall 514 may be disposed inside and in concentric and spaced-apart relationship to the inner impeller wall 513. Multiple impeller blades 515 may span or extend between the inner impeller wall 513 and the outer impeller wall 514. Each impeller blade 515 may have a concave curvature which faces the convex curvature of the adjacent impeller blade 515. According to an exemplary embodiment, the impeller 512 may include six impeller blades 515, though it is not limited to use only six impeller blades 515. Impeller magnets 516 may be provided on the exterior surface of the outer impeller wall 514 of the impeller 512.

At least one battery 568 may be disposed in the impeller interior 517 of the impeller 512. The impeller 512 may be configured to rotate about the battery 568 in flow of water through the impeller 512.

A stator 522 of the impeller assembly 511 may be disposed exterior to the impeller 512. The stator 522 may include multiple stator magnets 523. The stator magnets 523 of the stator 522 may magnetically interface sequentially with the impeller magnets 516 of the impeller 512 as the impeller 512 rotates and the stator 522 remains stationary with respect to the impeller 512. The battery 568 may electrically interface with the stator magnets 523 of the stator 522 according to the knowledge of those skilled in the art. Accordingly, as the impeller magnets 516 of the impeller 512 sequentially interface magnetically with the stator magnets 523 of the stator 522, the stator magnets 523 may be configured to generate electrical power which may be stored in the battery 568 for use.

In typical application, the impeller assembly 511 may be installed as the impeller assembly in the turbine 302 of the apparatus 300 which was heretofore described and illustrated with respect to FIGS. 4-10. Accordingly, the inlet cap 504 and the outlet cap 506 may be disposed at the inlet and outlet sides, respectively, of the impeller 512. As it falls through the inlets 533 of the inlet cap 504, the inlet ramps 536 in the respective inlets 533 direct the water against the concave surfaces of the respective impeller blades 515 of the impeller 512. The water subsequently falls from the blade spaces 524 between the adjacent impeller blades 515 through the outlets 543 in the outlet cap 506. The stator magnets 523 of the stator 522 may magnetically interface sequentially with the impeller magnets 516 of the impeller 512 as the impeller 512 rotates and the stator 522 remains stationary with respect to the impeller 512. The stator magnets 523 may thus generate electrical power which may be stored in the battery 568 for use. The impeller assembly 511 may be capable of bidirectional operation.

Figure 14:
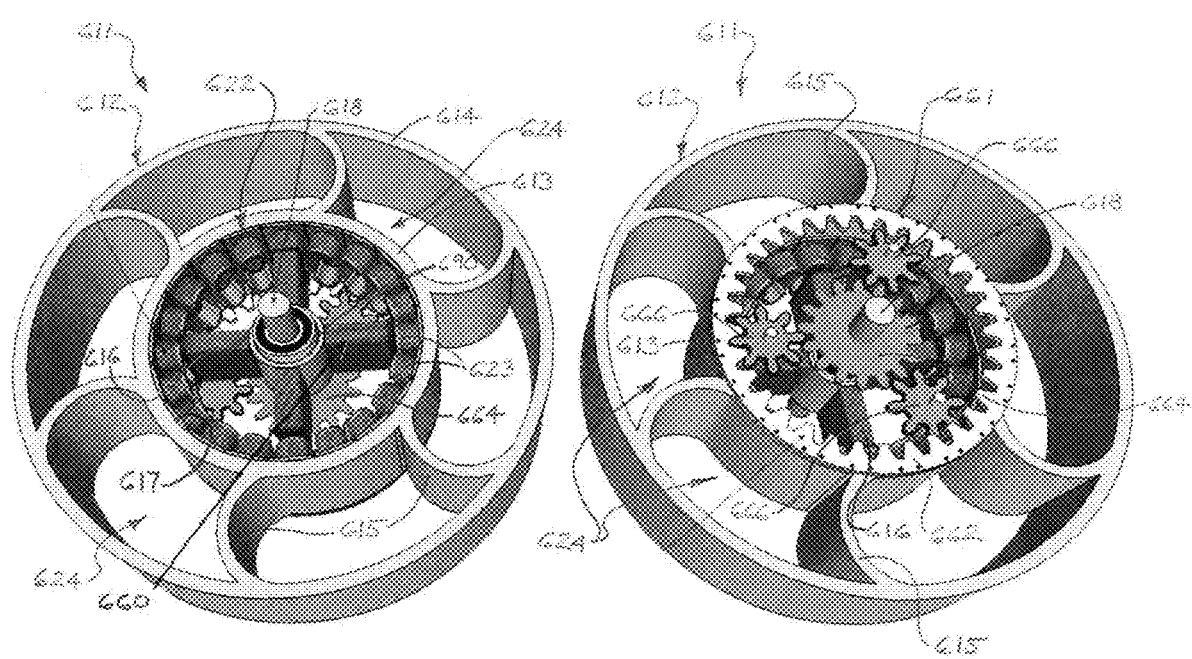
FIG. 14A is a top perspective view illustrating another alternative impeller assembly suitable for the turbine of the apparatus illustrated in FIGS. 4-10.
FIG. 14B is a bottom view of the impeller assembly illustrated in FIG. 14A.

Referring next to FIGS. 14A and 14B of the drawings, still another alternative impeller assembly 611 which is suitable for the turbine 311 of the apparatus 300 heretofore described and illustrated with respect to FIGS. 4-10 is shown. Unless otherwise noted, elements which are analogous to the respective elements of the impeller assembly 311 in the apparatus 300 that was heretofore described with respect to FIGS. 4-10 are designated by the same respective numerals in the 600 series for the impeller assembly 611 illustrated in FIGS. 14A and 14B. Accordingly, unless otherwise noted, the same description which was heretofore set forth with respect to the impeller assembly 311 of the apparatus 300 is incorporated by reference herein in its entirety with respect to the description of the impeller assembly 611.

In the impeller assembly 611, the stator 622 may be disposed in the impeller interior 617 of the impeller 612, in stationary relationship to the impeller 612. Accordingly, the stator magnets 623 of the stator 622 may be disposed in adjacent relationship to each other in facing relationship to the impeller interior 617. In some pumping and desalination applications, the impeller interior 317 may facilitate use of the impeller 312 as a rotor/bldc motor.

An impeller hub 690 may be centrally disposed in the impeller interior 617. A variable DC rotor 660 may include multiple impeller magnets 616 which extend outwardly from the impeller hub 690. The impeller magnets 616 of the variable DC rotor 660 may magnetically interface with the stator magnets 623 of the stator 622. In some embodiments, the stator magnets 623 of the stator 622 may electrically interface with the battery 368 (FIG. 4) of the apparatus 300.

A gear assembly 661 may be configured to transmit rotation from the impeller 612 to the impeller hub 690. In some embodiments, the gear assembly 661 may include a ring gear 662. The ring gear 662 may be attached to and rotatable with the inner impeller wall 613 of the impeller 612 according to the knowledge of those skilled in the art. A sun gear 664 may be attached to and rotatable with the impeller hub 690 according to the knowledge of those skilled in the art. Multiple stationary planetary gears 666 may mesh with the ring gear 662 and with the sun gear 664. Accordingly, the planetary gears 666 may be configured to transmit rotation from the ring gear 662 to the sun gear 664 as the impeller 612 rotates. The sun gear 664 may, in turn, be configured to rotate the impeller magnets 616 of the variable DC rotor 660 such that the impeller magnets 616 on the rotating impeller 612 sequentially magnetically interface with the stationary stator magnets 623 of the stator 622 and generate electrical power which may be stored in the battery 368 (FIG. 4) of the apparatus 300 in some applications.

In typical application, the impeller assembly 611 may be installed as the impeller assembly in the turbine 302 of the apparatus 300 which was heretofore described and illustrated with respect to FIGS. 4-10. The water from the working water column 382 may fall through the inlets 333 of the inlet cap 304, which direct the water against the concave surfaces of the respective impeller blades 615 of the impeller 612. The water subsequently falls from the blade spaces 624 between the adjacent impeller blades 615 through the outlets 343 in the outlet cap 306. The gear assembly 661 may transmit rotation from the inner impeller wall 613 of the impeller 612 to the impeller hub 690, typically as was heretofore described, such that the impeller hub 690 rotates the attached impeller magnets 616 of the variable DC rotor 660. The stator magnets 623 of the stator 622 may magnetically interface sequentially with the impeller magnets 616 of the impeller 612 as the impeller 612 rotates and the stator 622 remains stationary with respect to the impeller 612. The stator magnets 623 may thus generate electrical power which may be stored in the battery 368 for use. In some applications, the impeller 612 may be mechanically configured to perform other work. The impeller assembly 611 may be capable of bidirectional operation.

Figure 15:
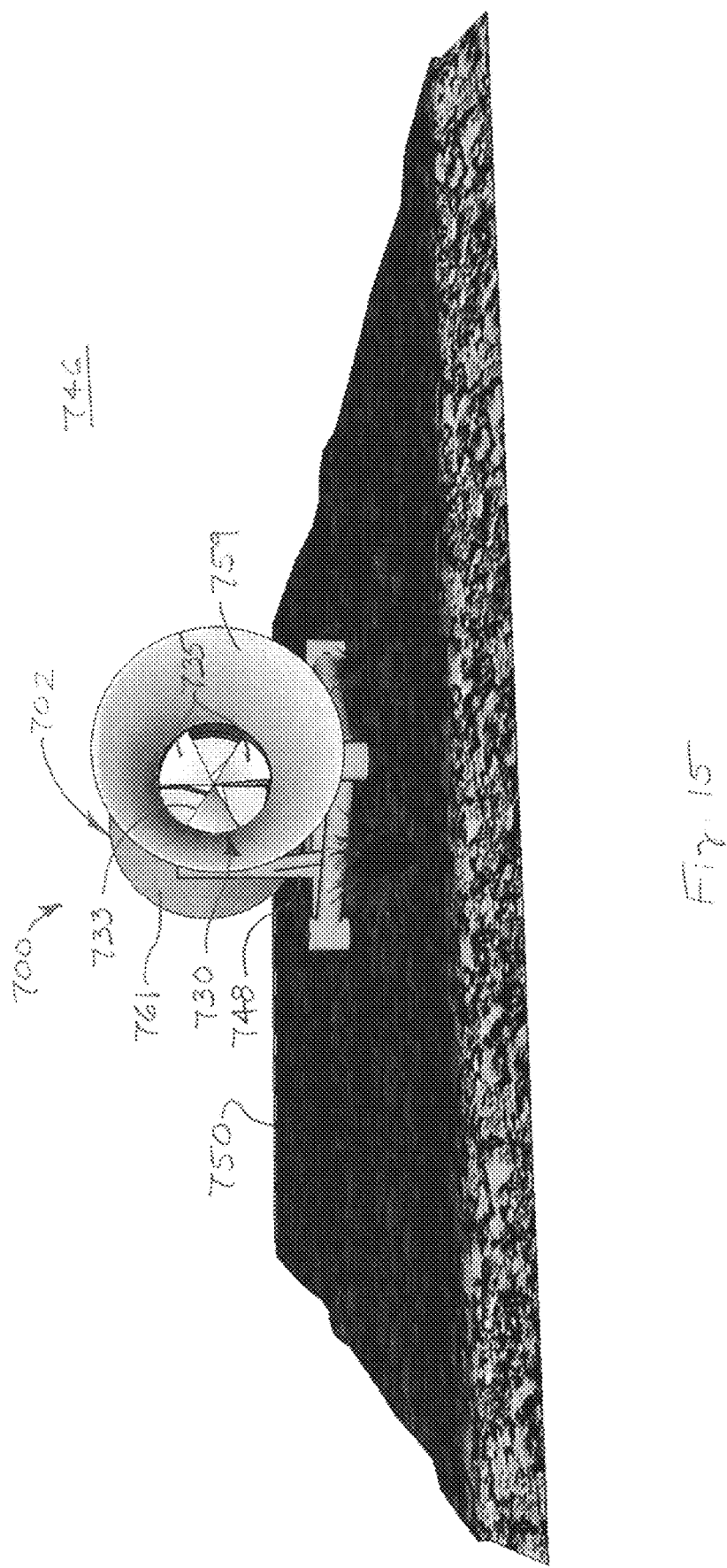
FIG. 15 is a front perspective view of another exemplary oscillating water column turbine apparatus, in accordance with an alternative illustrative embodiment of the present invention, with the apparatus deployed in place on the floor of a water body in typical application of the apparatus.
Figure 16:
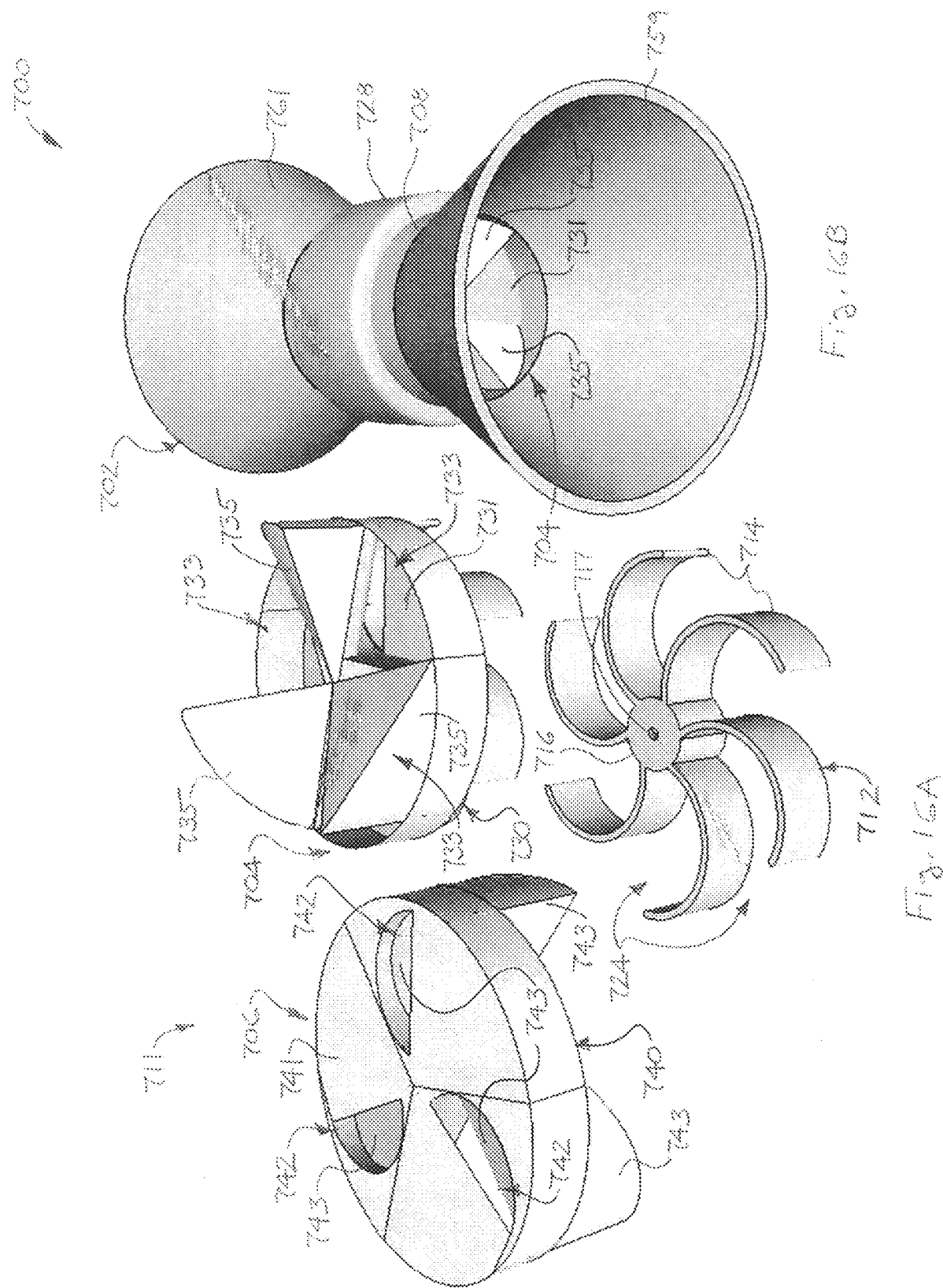
FIG. 16A is an exploded perspective view of the apparatus illustrated in FIG. 15.
FIG. 16B is a front perspective view of the apparatus illustrated in FIG. 15.

Referring next to FIGS. 15, 16A and 16B of the drawings, another alternative embodiment of the oscillating water column turbine apparatuses, hereinafter apparatus 700 of the disclosure is shown. As illustrated in FIG. 15 and will be hereinafter described, in typical application, the apparatus 700 may be deployed in a water body 746 and utilize the tidal action of water in the water body 746 to generate electrical power and/or perform other work. The apparatus 700 may include a tidal turbine 702. As illustrated in FIG. 16B, the turbine 702 may have a turbine housing 708. An inlet funnel cone 759 and an outlet funnel cone 761 may be disposed in fluid communication with the turbine housing 708.

As further illustrated in FIG. 16B, in some embodiments, the turbine housing 708 may include a stator housing 728. A stator (not illustrated) may be disposed in the stator housing 728. In some embodiments, the stator of the apparatus 700 may have a design which is the same as or like that of the stator 322 of the apparatus 300 which was heretofore described with respect to FIGS. 4-10. Accordingly, the description of the stator 322 of the apparatus 300 which was heretofore described with respect to FIGS. 4-10 is incorporated by reference herein in its entirety with respect to the description of the stator of the apparatus 700. The stator may include multiple stator magnets which may be circumferentially arranged around the interior of the stator housing 728.

As illustrated in FIG. 16A, an impeller assembly 711 of the apparatus 700 may include an impeller 712. The impeller 712 may be disposed for rotation in the turbine housing 708 inside the stator in the stator housing 728 according to the knowledge of those skilled in the art. As illustrated in FIG. 16A, the impeller 712 may include an impeller hub 716. A shaft opening 717 may extend through the impeller hub 716. The shaft opening 717 may be sized and configured to receive an impeller shaft (not illustrated) which rotatably mounts the tidal impeller 712 in the turbine housing 708 according to the knowledge of those skilled in the art.

Multiple impeller blades 714 may extend outwardly from the impeller hub 716. According to an exemplary embodiment, the impeller 712 may include six impeller blades 714, though it is not limited to use only six blades. In some applications, the impeller hub 716 and/or the impeller shaft (not illustrated) may be coupled to an electrical generator (not illustrated) which generates electrical power responsive to rotation of the impeller 712. Additionally, or alternatively, the impeller 712 may be configured to perform other work. In some embodiments, the impeller 712 may be a scroll style impeller having six curved impeller blades 714. A blade space 724 may be formed by and between each pair of adjacent impeller blades 714. In some embodiments, impeller magnets (not illustrated) may be provided on the respective impeller blades 714 of the impeller 712. Accordingly, in some embodiments, the stator of the apparatus 700 may have a design which is the same as or like that of the stator 322 of the apparatus 300 which was heretofore described with respect to FIGS. 4-10. Accordingly, the description of the impeller 412 of the impeller assembly 411 which was heretofore described with respect to FIGS. 11 and 12 is incorporated by reference herein in its entirety with respect to the description of the impeller 412 of the apparatus 700.

The turbine 702 may include an inlet cap 704 and an outlet cap 706 disposed at the respective inlet and outlet ends of the turbine housing 708, typically inside the respective inlet funnel cone 759 and outlet funnel cone 761. The impeller 712 may be coaxially and rotatably sandwiched between the inlet cap 704 and the outlet cap 706 on the impeller shaft. The apparatus 700 may be capable of bidirectional operation.

As illustrated in FIG. 16A, the inlet cap 704 may include an inlet cap body 730. The inlet cap body 730 may have an inlet cap body surface 731. Multiple, typically three, inlets 733 may extend through the inlet cap body surface 731. The inlets 733 may be positioned 120 degrees apart with respect to each other. The inlets 733 in the inlet cap 704 may be directed towards the inside curvature, or concave side or surface, of each scroll style impeller blade 714.

In some embodiments, inlet guide ramps 735 may protrude from the plane of the inlet cap body surface 731 of the inlet cap 704 adjacent to the respective inlets 733. The inlet guide ramps 735 may be configured to compress, channel, exert or concentrate flow of water against the concave surfaces of the impeller blades 714 of the impeller 712 in the turbine housing 708, typically as will be hereinafter further described.

As further illustrated in FIG. 16A, the outlet cap 706 may include an outlet cap body 740. The outlet cap body 740 may have an outlet cap body surface 741. Multiple, typically three, outlets 742 may extend through the outlet cap body surface 741. In some embodiments, each outlet 742 may have a semicircular shape. An outlet guide ramp 743 may extend into each outlet 742.

The outlets 742 in the outlet cap 706 may be configured to facilitate flow of the water from the blade spaces 724 between the impeller blades 714 of the impeller 712 typically through the outlet funnel cone 761 back into the water body. The outlet guide ramps 743 in the respective outlets 742 may be configured to direct or channel the water unimpeded through the outlet funnel cone 761 into the water body.

In some embodiments, the inlet cap 704 may include three inlets 733 that are 120 degrees apart with respect to each other around the circumference of the inlet cap 704. The outlet cap 706 may include three outlets 742 that are 120 degrees apart with respect to each other around the circumference of the outlet cap 706. The inlets 733 and the outlets 742 may be designed in such a way as to compress, channel, and exert air pressure against the impeller blades 714 of the impeller 712 as water enters the turbine housing 708 through the inlet funnel cone 759 to rotate the impeller 712 in the turbine housing 708.

Each blade space 724 between each adjacent pair of impeller blades 714 of the impeller 712 can only be occupied by or disposed in fluid communication with either one inlet 733 in the inlet cap 704 or one outlet 742 in the outlet cap 706 at a time so as to facilitate the pathway for flow of water which pressurizes the impeller blades 714 and rotates the impeller 712. Any number of inlets 733 and outlets 742 with twice the number of impeller blades 714 of the impeller 712 with a related angle of separation and standoff size can work with the design disclosed herein without departing from the scope and spirit of the invention. The inlets 733 of the inlet cap 704 and the outlets 742 of the outlet cap 706 may be directed towards the inside curvature, or concave side or surface, of each impeller blade 714.

In some embodiments, at least one impeller magnet (not illustrated) may be provided on each impeller blade 714 of the impeller 712. The stator magnets of the stator in the stator housing 728 may magnetically interface sequentially with the impeller magnets of the impeller 712 as the impeller 712 rotates and the stator remains stationary with respect to the impeller 712. Accordingly, as the impeller magnets of the impeller 712 sequentially interface magnetically with the stator magnets of the stator, the stator magnets may be configured to generate electrical power which may be stored in a battery (not illustrated) for use. In some embodiments, each of the impeller magnets and the stator magnets may include neodymium magnets.

As illustrated in FIG. 15, in typical application, the apparatus 700 may be deployed in the ocean or other water body 746. Accordingly, in some applications, an apparatus stand 748 may support the turbine 702 on the floor 750 of the water body 746. The turbine 702 may be oriented with the inlet funnel cone 759 facing the incoming tidal action of the water in the water body 746. Water thus flows from the water body typically through the inlet funnel cone 759 and the inlets 733 of the inlet cap 704. The inlet guide ramps 735 and the respective inlets 733 may channel and concentrate flow of the water into the blade spaces 724 and against the concave surfaces of the respective impeller blades 714 of the impeller 712 to rotate the impeller 712 inside the stator in the stator housing 728. The water may then flow from the blade spaces 724 through the outlets 742 in the outlet cap 706 and the outlet funnel cone 761 of the turbine 702, respectively, back into the water body 746. The stator magnets of the stator may magnetically interface sequentially with the impeller magnets of the impeller 712 as the impeller 712 rotates and the stator remains stationary with respect to the impeller 712. The stator magnets may thus generate electrical power which may be stored in the battery for use. In some applications, the impeller 712 may be mechanically configured to perform other work. As the tide changes directions, the water may flow in the opposite direction through the turbine 702 to drive the impeller 712 and generate electrical power and/or perform other work.

Referring next to FIGS. 17-24 of the drawings, yet another illustrative embodiment of the hydrogen oscillating water column (OWC) turbine apparatuses is indicated by reference numeral 800. Unless otherwise noted, in the apparatus 800, elements which are analogous to the respective elements of the apparatus 300 that was heretofore described with respect to FIGS. 4-10 are designated by the same respective numerals in the 800 series in FIGS. 17-24. Accordingly, unless otherwise noted, the same description which was heretofore set forth with respect to the apparatus 300 is incorporated by reference herein in its entirety with respect to the description of the apparatus 800.

Figure 17:
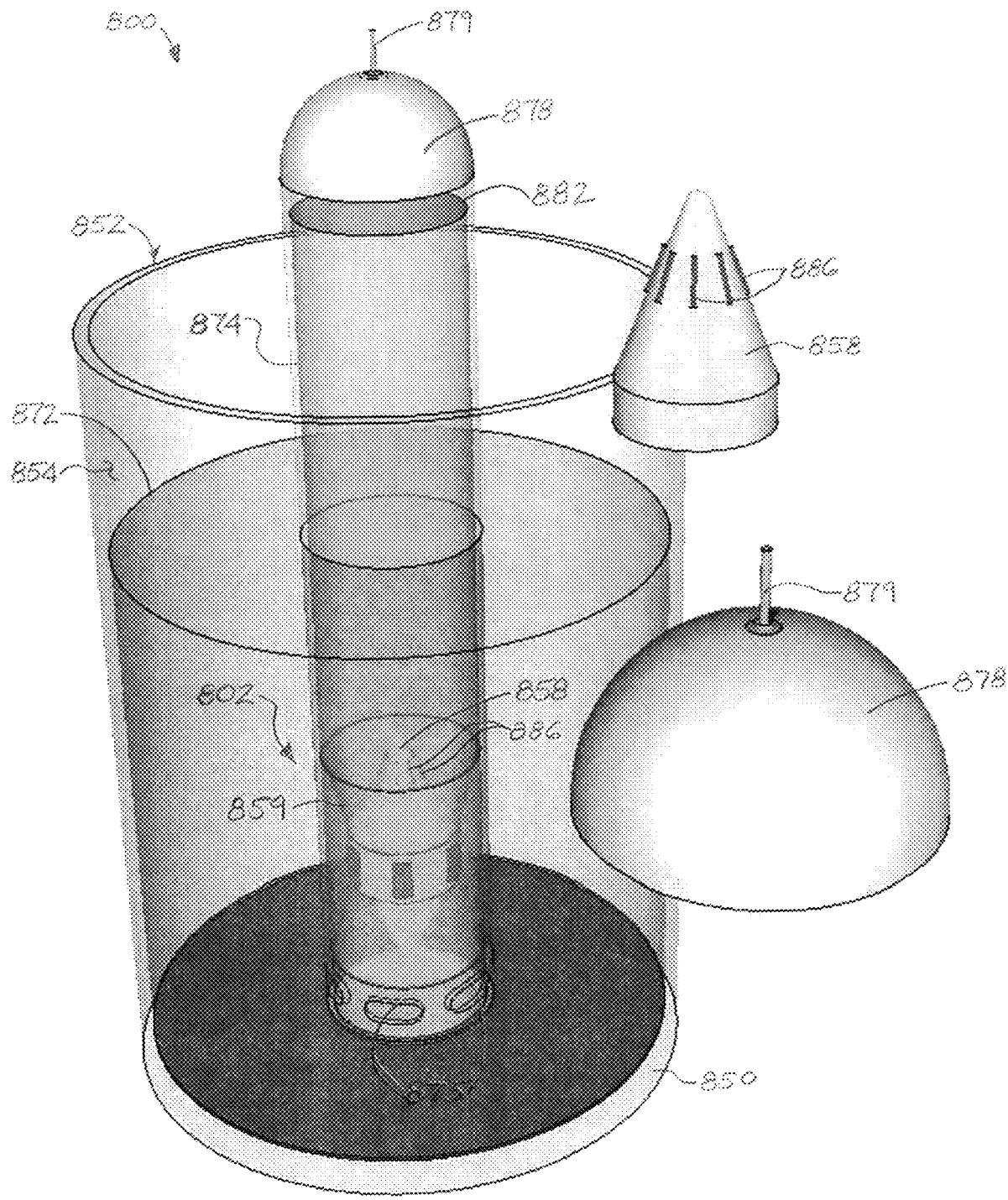
FIG. 17 is a perspective view an exemplary hydrogen oscillating water column (OWC) turbine apparatus, in accordance with yet another alternative illustrative embodiment of the present invention, with an inlet water column in a water cylinder of the apparatus and a working water column in a water column tube of the apparatus in typical application of the apparatus, and additionally illustrating enlarged perspective views of a typical inner inlet funnel cone and tube cap of the apparatus.
Figure 18:
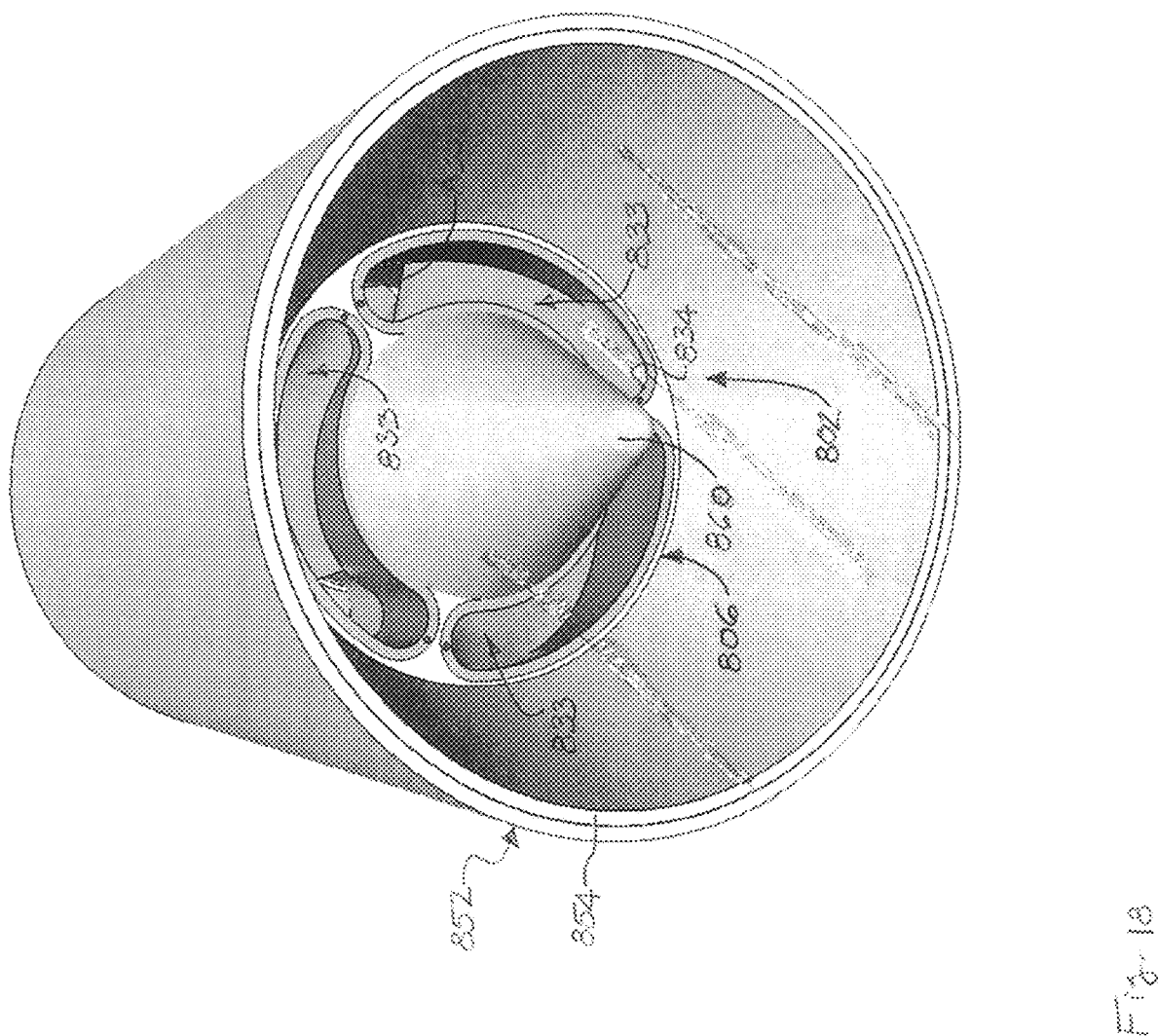
FIG. 18 is a bottom perspective view of the apparatus illustrated in FIG. 17, with the apparatus base removed from the water cylinder to expose the outlet cap and the inner outlet funnel cone of the turbine.
Figure 19:
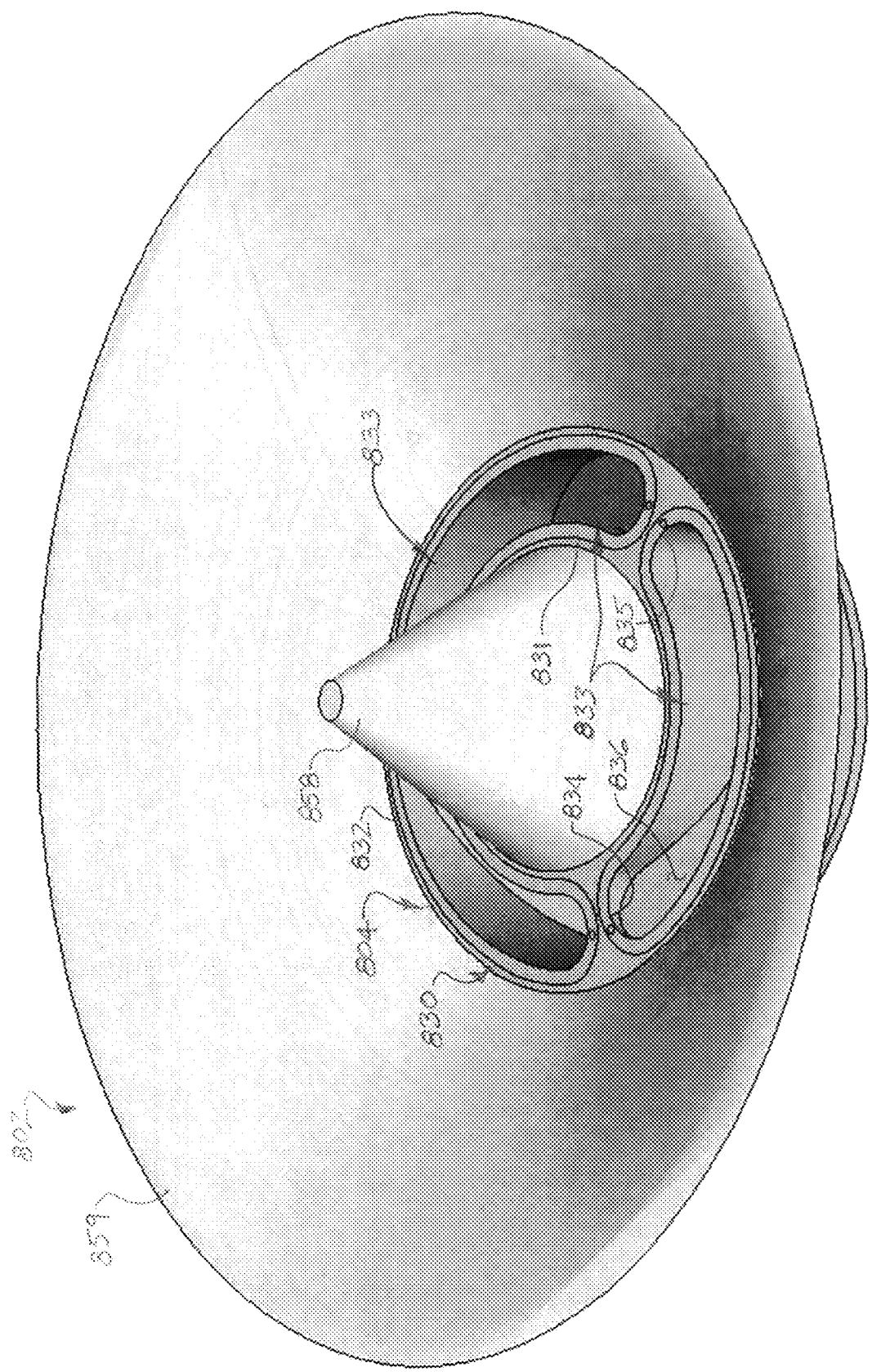
FIG. 19 is a top perspective view of the turbine of the apparatus illustrated in FIG. 17.
Figure 20:
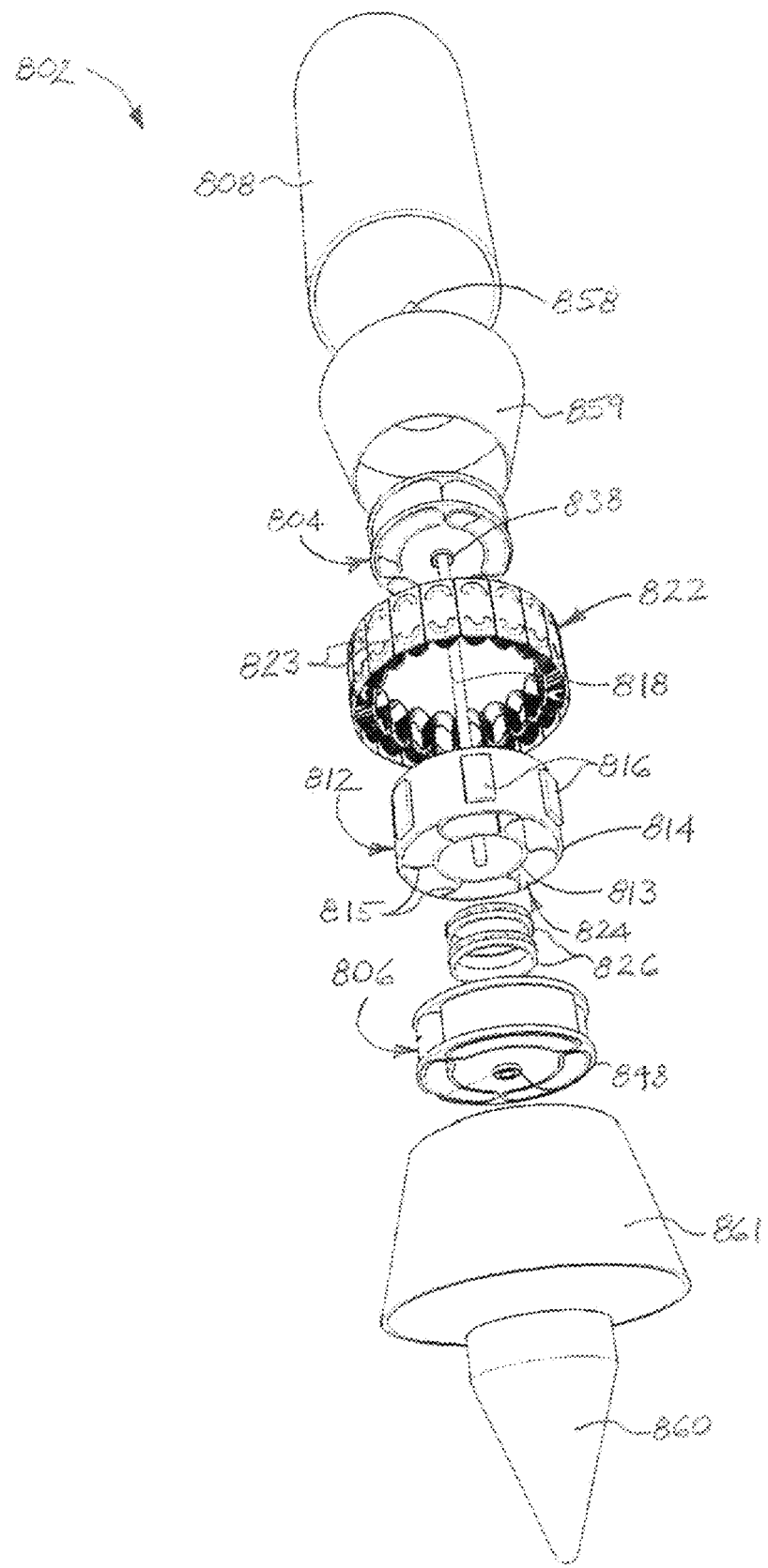
FIG. 20 is a bottom perspective view of the turbine of the apparatus illustrated in FIG. 17.

In the apparatus 800, the inner inlet funnel cone 858 and the inner outlet funnel cone 860 of the turbine 802 may be substantially the same size. As illustrated in FIG. 17, at least one, and typically, multiple electrolysis electrodes 886 may be provided on the exterior surface of the inner inlet funnel cone 858. The reverse osmosis membranes 310 (FIG. 6) may be omitted from the inlet cap 804, the outlet cap 806 and the impeller 812. Additionally, the clean water discharge tube 364 and the floating function of the inner outlet funnel cone 360 may be omitted. Application of the apparatus 800 may as be heretofore described with respect to application of the apparatus 300 in FIGS. 4-10. The apparatus 800 may be capable of bidirectional operation.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An apparatus for generating electricity from an oscillating water column, the apparatus comprising:
    a water cylinder including:
        a cylinder housing; and
        a water piston slidably disposed in the cylinder housing, the water piston configured to slide between a first position and a second position in the cylinder housing in response to oscillation of water in the cylinder housing, thereby creating a pressure difference to allow pressurized fluid to enter and/or escape from the cylinder housing; and
    a turbine including:
        an inlet cap supported by the cylinder housing of the water cylinder, the inlet cap having "n" number of inlets;
        an outlet cap disposed in spaced-apart relationship to the inlet cap in the cylinder housing, the outlet cap having "n" number of outlets; and
        an impeller rotatably and coaxially disposed between the inlet cap and the outlet cap, the impeller having "2n" number of impeller blades and blade spaces between the impeller blades, further only one of the inlets or one of the outlets is configured to position at each one of the blade spaces for facilitating fluid pressure to enter and/or escape in a direction towards the impeller blades; and
    wherein the pressure difference allowing the pressurized fluid to enter and/or escape from the cylinder housing of the water cylinder rotates the impeller of the turbine to facilitate generation of electrical current.

2. The apparatus of claim 1, wherein the impeller is a scroll style impeller having 6 curved blades.

3. The apparatus of claim 1, wherein the inlets of the inlet cap are three in number and oriented 120 degrees apart from each other.

4. The apparatus of claim 1, wherein the outlets of the outlet cap are three in number and oriented 120 degrees apart from each other.

5. The apparatus of claim 1, wherein the openings of the inlets, respectively, at the inlet cap are oriented in opposite direction to the openings of the outlets, respectively, at the outlet cap.

6. The apparatus of claim 1, wherein the inlet cap further comprises three standoffs having 60-degree rotational offset.

7. The apparatus of claim 1, wherein the outlet cap further comprises three indentations having 60-degree rotational offset.

8. An apparatus for generating electricity from an oscillating water column, the apparatus comprising:
   a water cylinder including:
      a cylinder housing configured to contain an inlet water column;
      a water column tube disposed within the cylinder housing, the water column tube configured to receive water from the inlet water column and form a working water column;
      at least one electrolysis electrode in the water column tube, the at least one electrolysis electrode configured to generate hydrogen gas and oxygen gas by electrolysis of water in the working water column;
      a hydrogen dome on the water column tube, the hydrogen dome configured to receive a hydrogen/oxygen mixture from the hydrogen gas and the oxygen gas; and
      a spark generating device in the hydrogen dome, the spark generating device configured to ignite the hydrogen/oxygen mixture in the hydrogen dome and pressurize and displace the working water column in the water column tube; and
   a turbine disposed in the water column tube of the water cylinder, the turbine including:
      an inlet cap having "n" number of inlets;
      an outlet cap disposed in spaced-apart relationship to the inlet cap, the outlet cap having "n" number of outlets; and
      an impeller assembly including:
         an impeller rotatably and coaxially supported between the inlet cap and the outlet cap, the impeller having "2n" number of impeller blades and blade spaces between the impeller blades, only one of the inlets or one of the outlets is configured to position at each blade space between two adjacent impeller blades for facilitating water pressure to enter and/or escape in a direction towards the impeller blades; and
   wherein the water in the working water column pressurizes the impeller blades and rotates the impeller of the turbine to facilitate generation of electrical current and/or perform work as the working water column is pressurized and displaced in the water column tube.

9. The apparatus of claim 8, wherein the impeller is a scroll style impeller having 6 curved blades.

10. The apparatus of claim 8, wherein the inlets of the inlet cap are three in number and oriented 120 degrees apart from each other.

11. The apparatus of claim 8, wherein the outlets of the outlet cap are three in number and oriented 120 degrees apart from each other.

12. The apparatus of claim 8, wherein the openings of the inlets, respectively, at the inlet cap are oriented in opposite direction to the openings of the outlets, respectively, at the outlet cap.

13. The apparatus of claim 8, further comprising at least one inlet funnel cone extending from the inlet cap and at least one outlet funnel cone extending from the outlet cap.

14. The apparatus of claim 13, wherein the at least one inlet funnel cone comprises an inner inlet funnel cone and an outer inlet funnel cone exterior to the inner inlet funnel cone, and the at least one outlet funnel cone comprises an inner outlet funnel cone and an outer outlet funnel cone exterior to the inner outlet funnel cone.

15. The apparatus of claim 13, further comprising at least one reverse osmosis membrane in the turbine and a clean water discharge tube disposed in fluid communication with the reverse osmosis membrane.

16. The apparatus of claim 8, wherein the impeller of the impeller assembly comprises a plurality of impeller magnets, and wherein the impeller assembly further comprises a stator having a plurality of stator magnets magnetically interfacing with the impeller magnets of the impeller, wherein the stator magnets are configured to generate electrical power as the impeller magnets of the impeller sequentially interface magnetically with the stator magnets of the stator responsive to rotation of the impeller.

17. An apparatus for generating electricity from an oscillating water column, the apparatus comprising:
   a turbine including:
      a turbine housing;
      an inlet funnel cone at a first end of the turbine housing;
      an outlet funnel cone at a second end of the turbine housing;
      an inlet cap disposed in the turbine housing at the inlet funnel cone, the inlet cap having "n" number of inlets;
      an outlet cap disposed in spaced-apart relationship to the inlet cap in the turbine housing at the outlet funnel cone, the outlet cap having "n" number of outlets; and
      an impeller rotatably and coaxially disposed in the turbine housing between the inlet cap and the outlet cap, the impeller having "2n" number of impeller blades and blade spaces between the impeller blades, wherein the impeller is rotatably sandwiched between the inlet cap and the outlet cap, further only one of the inlets or one of the outlets is configured to position at each blade space between two adjacent impeller blades for facilitating fluid pressure to enter and/or escape in a direction towards the impeller blades; and
   wherein the impeller is configured to rotate in the turbine housing as tidal water flows through the inlet funnel cone and the inlets of the inlet cap against the impeller blades of the impeller and from the blade spaces between the impeller blades through the outlets of the outlet cap and the outlet funnel cone, respectively.

18. The apparatus of claim 17 further comprising a stator housing in the turbine housing and a stator having a plurality of stator magnets circumferentially arranged around an interior of the stator housing, and wherein the impeller is rotatably disposed in the stator and comprises a plurality of impeller magnets configured to generate electrical power as the impeller magnets of the impeller sequentially interface magnetically with the stator magnets of the stator responsive to rotation of the impeller.

19. The apparatus of claim 17 wherein the inlet cap comprises an inlet cap body having an inlet cap body surface and the inlets extend through the inlet cap body surface, and further comprising a plurality of inlet guide ramps protruding from the inlet cap body surface of the inlet cap body adjacent to the inlets, respectively.

20. The apparatus of claim 17 further comprising an apparatus stand, and wherein the turbine is supported by the apparatus stand.

\* \* \* \* \*